May 2, 1967
A. H. SMITH
3,316,579
APPARATUS FOR SELECTIVELY POLISHING, SCRUBBING AND CLEANING FLOORS
Filed Jan. 30, 1964
10 Sheets-Sheet 1
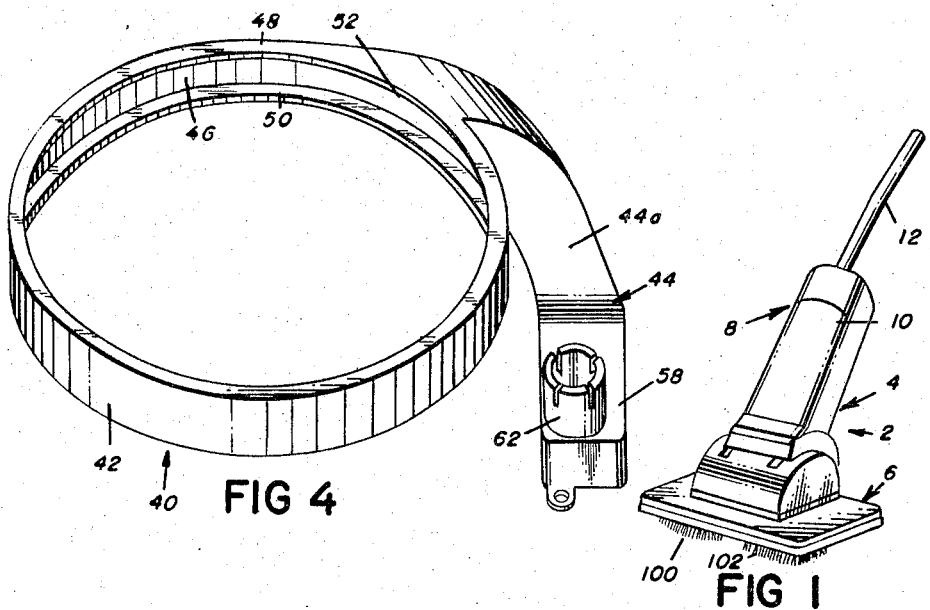
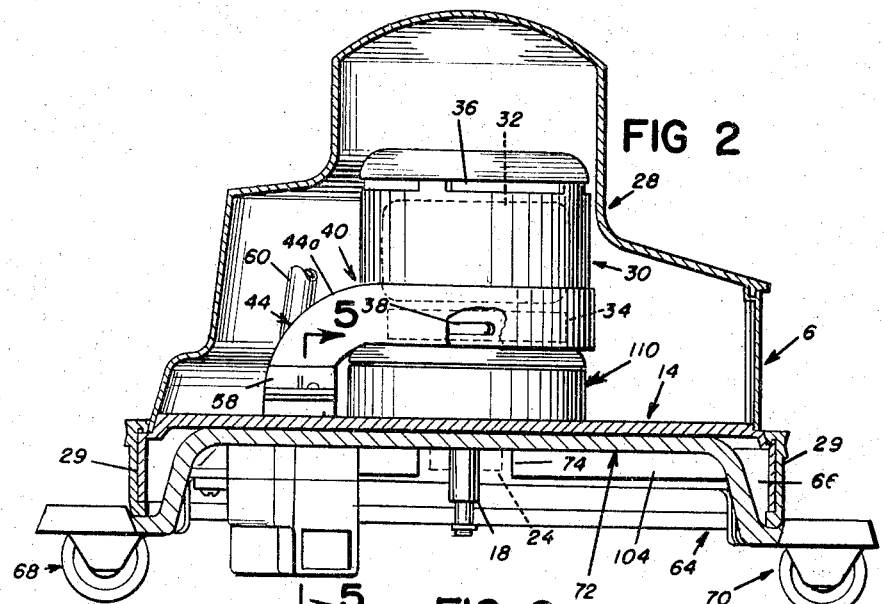
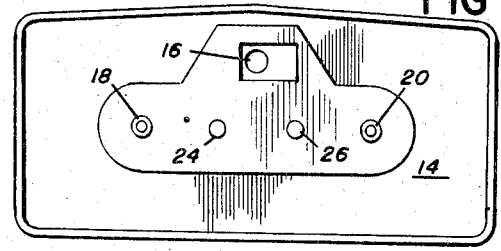
Aaron H. Smith
INVENTOR
BY Jacobi & Davidson
ATTORNEYS May 2, 1967 A. H. SMITH 3,316,579
APPARATUS FOR SELECTIVELY POLISHING, SCRUBBING
AND CLEANING FLOORS
Filed Jan. 30, 1964 10 Sheets-Sheet 2
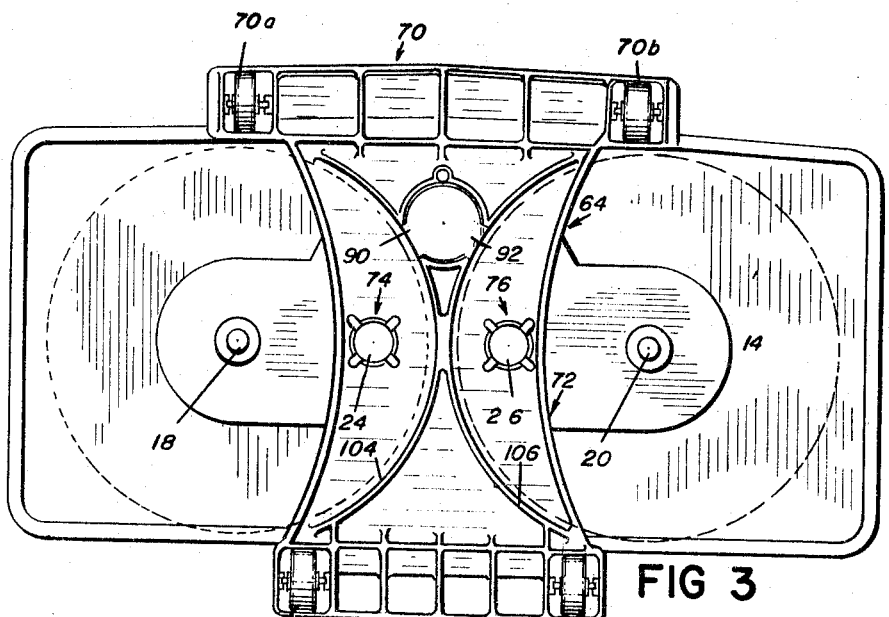
FIG 3
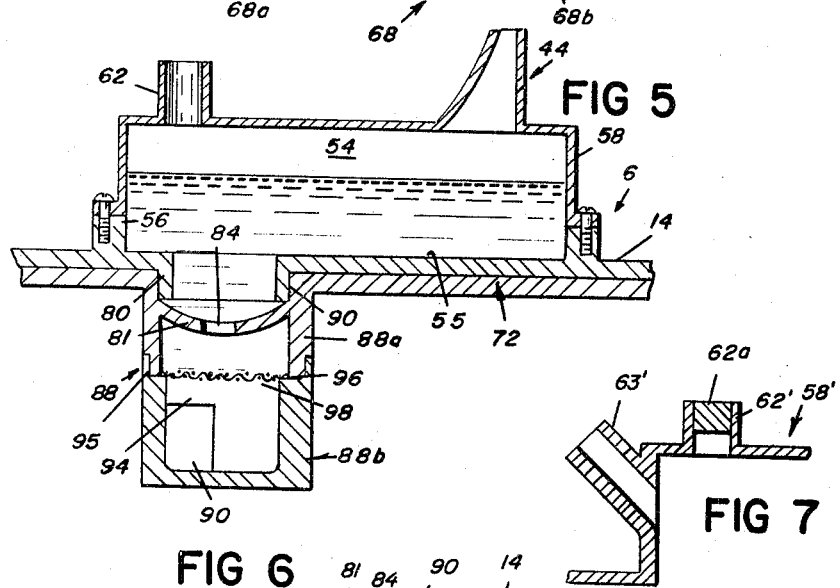
FIG 5
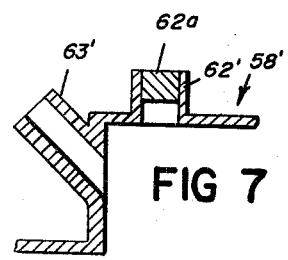
FIG 7
FIG 6
Aaron H. Smith
INVENTOR
BY *Jacaliis E. Davidson*
ATTORNEYS

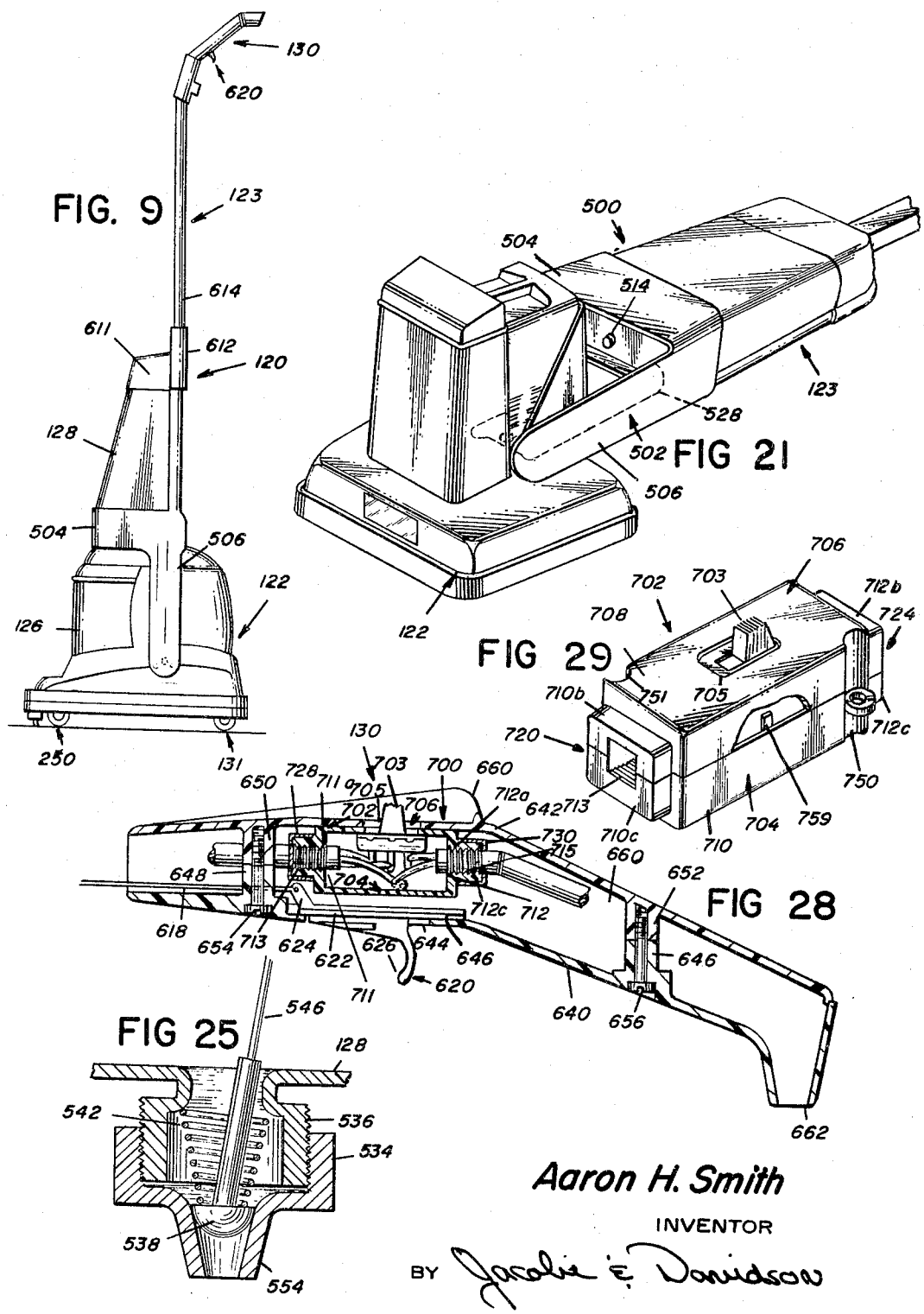

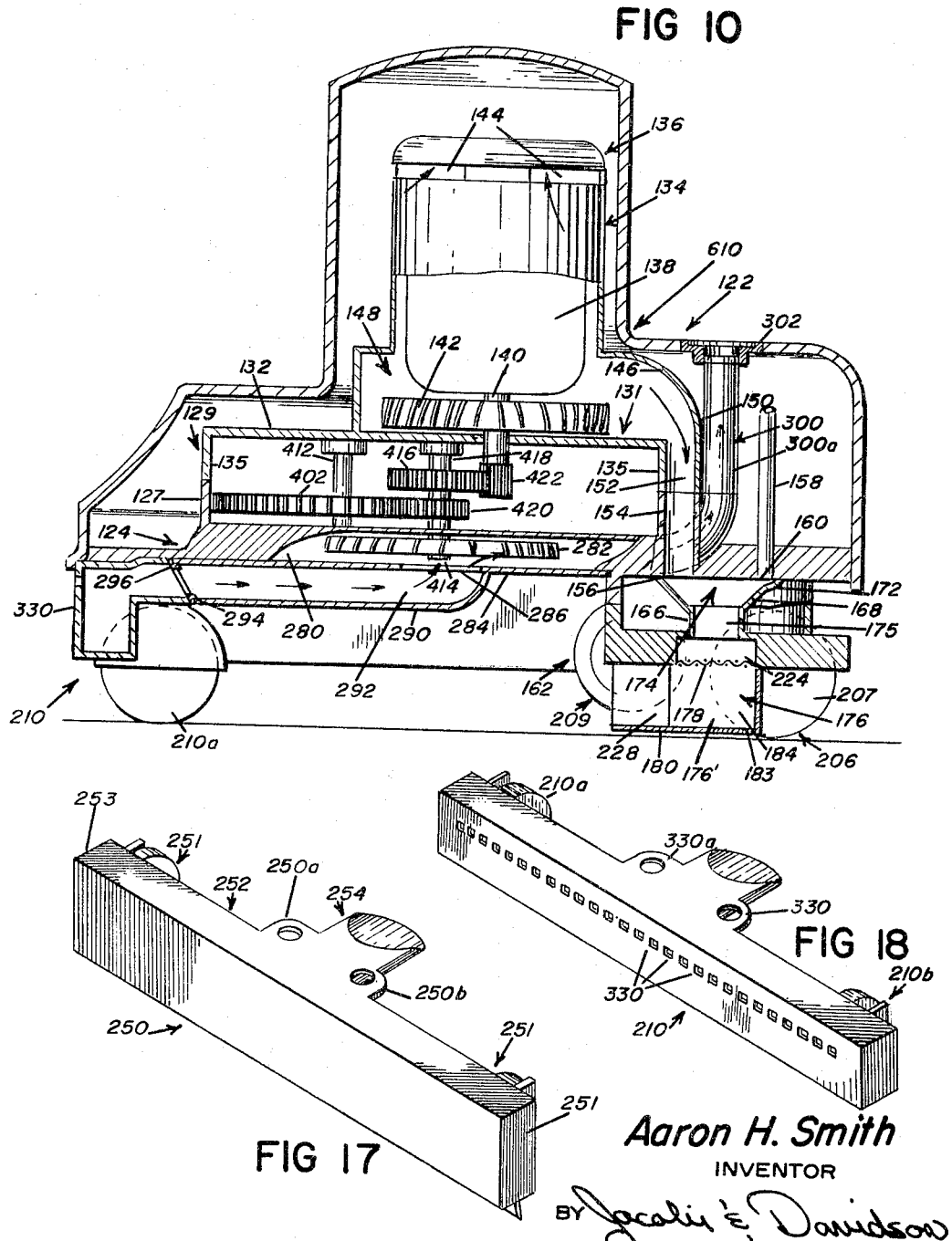

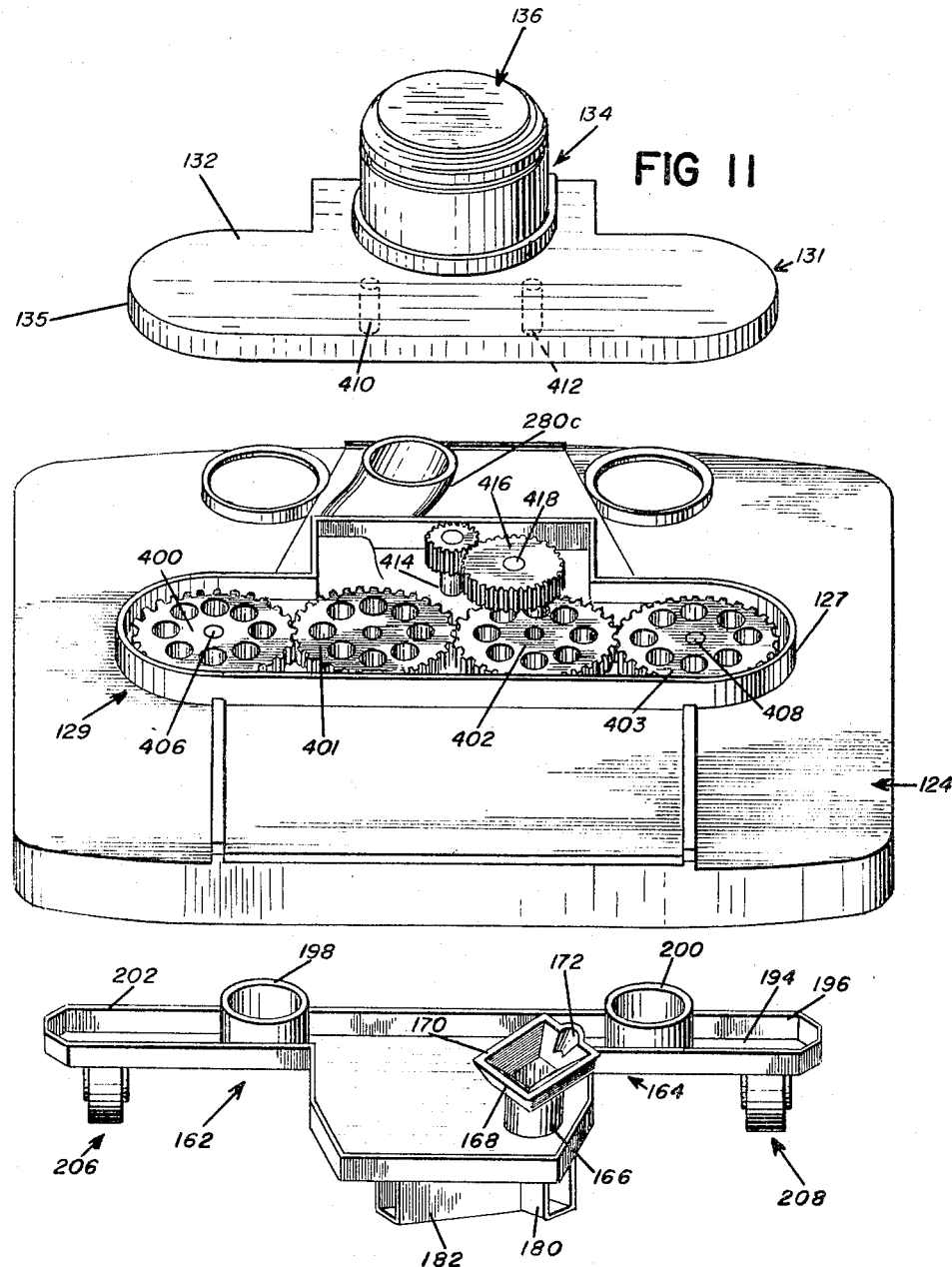

May 2, 1967
A. H. SMITH
3,316,579
APPARATUS FOR SELECTIVELY POLISHING, SCRUBBING AND CLEANING FLOORS
Filed Jan. 30, 1964
10 Sheets-Sheet 6
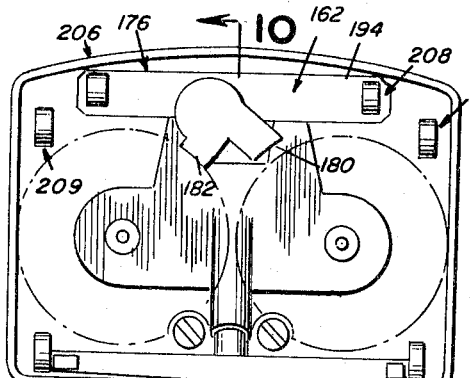
FIG 12
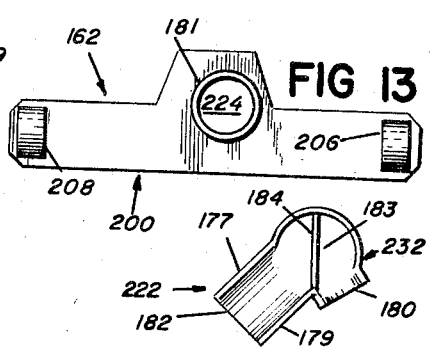
FIG 13
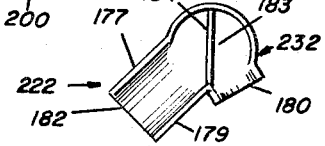
FIG 14
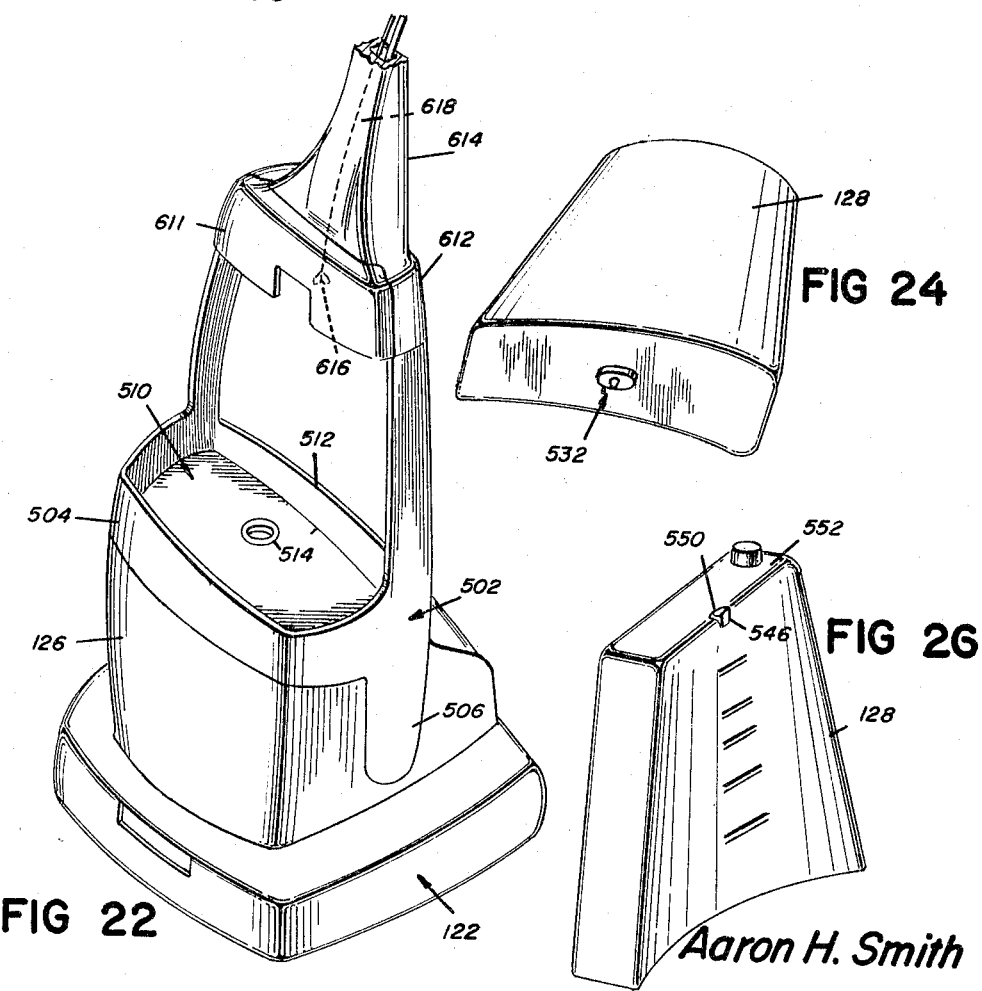
FIG 22
FIG 24
FIG 26
*Aaron H. Smith*
INVENTOR
BY *Jacobi E. Davidson*
ATTORNEYS May 2, 1967
A. H. SMITH
3,316,579
APPARATUS FOR SELECTIVELY POLISHING, SCRUBBING
AND CLEANING FLOORS
Filed Jan. 30, 1964
10 Sheets-Sheet 7
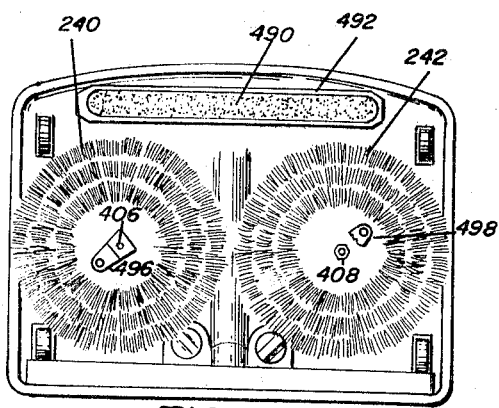
FIG 20
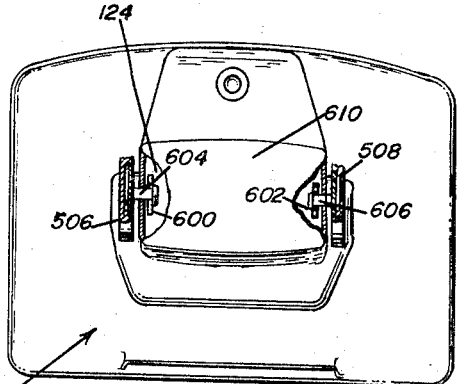
FIG 27
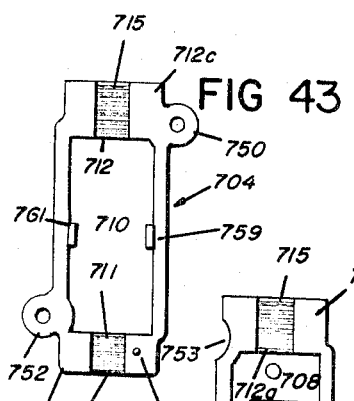
FIG 43
FIG 42
FIG 15
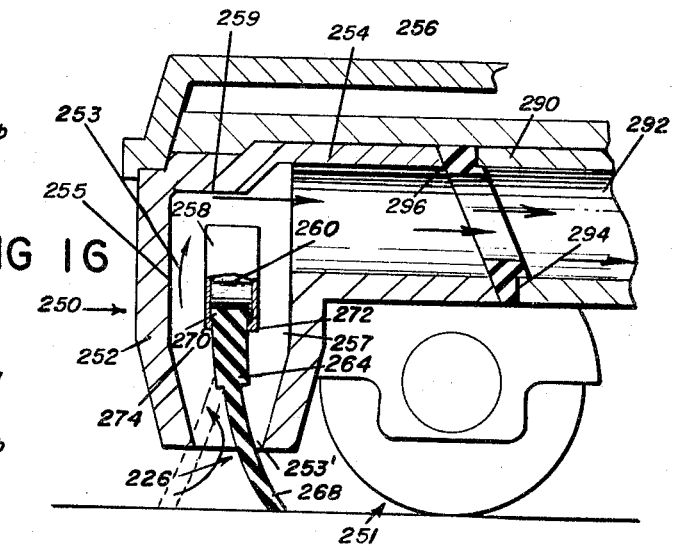
FIG 16
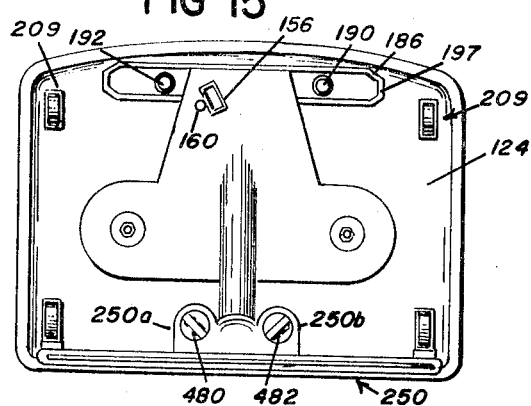
Aaron H. Smith
INVENTOR
BY Jacalin E. Davidson
ATTORNEYS

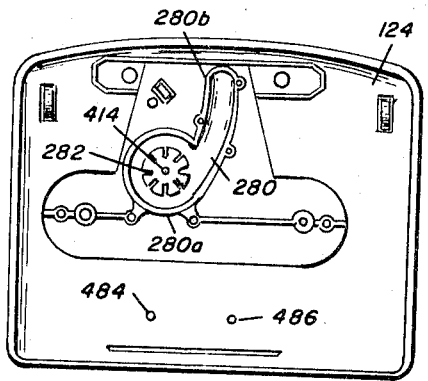
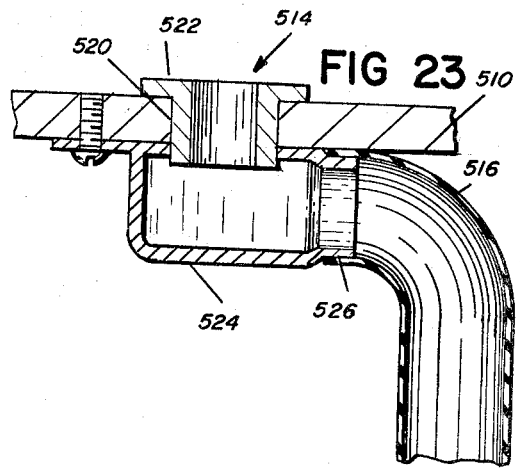
FIG 19
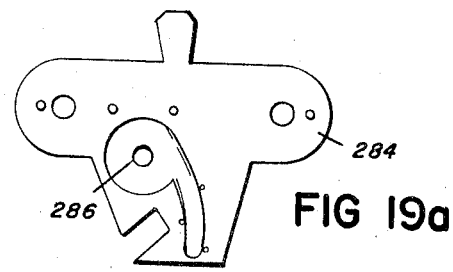
FIG 19a
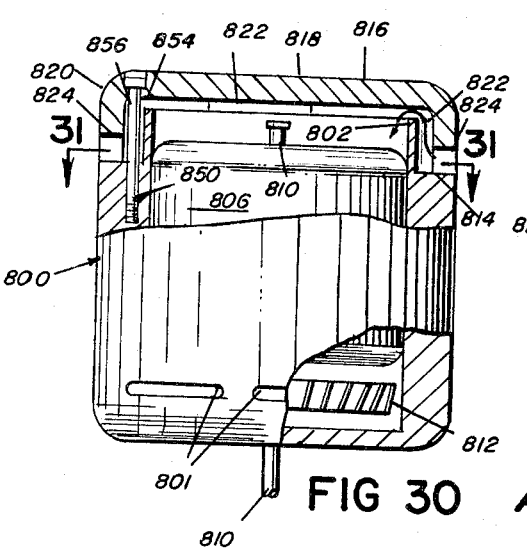
FIG 30
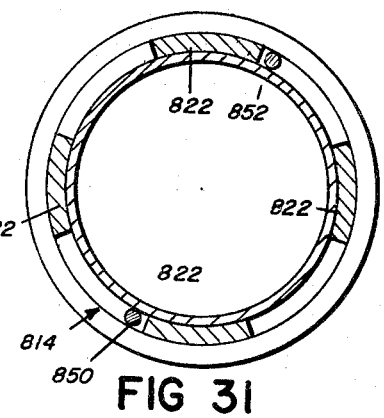
FIG 31
Aaron H. Smith
INVENTOR Aaron H. Smith
INVENTOR May 2, 1967
A. H. SMITH
3,316,579
APPARATUS FOR SELECTIVELY POLISHING, SCRUBBING AND CLEANING FLOORS
Filed Jan. 30, 1964
10 Sheets-Sheet 10
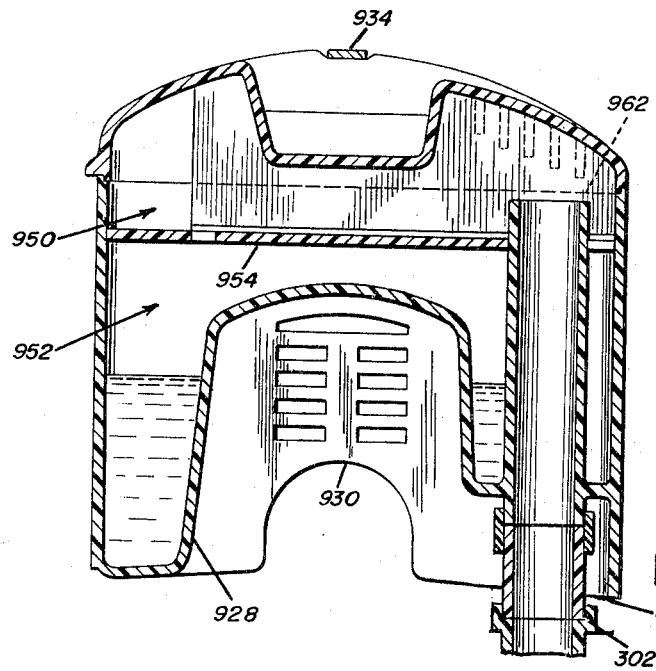
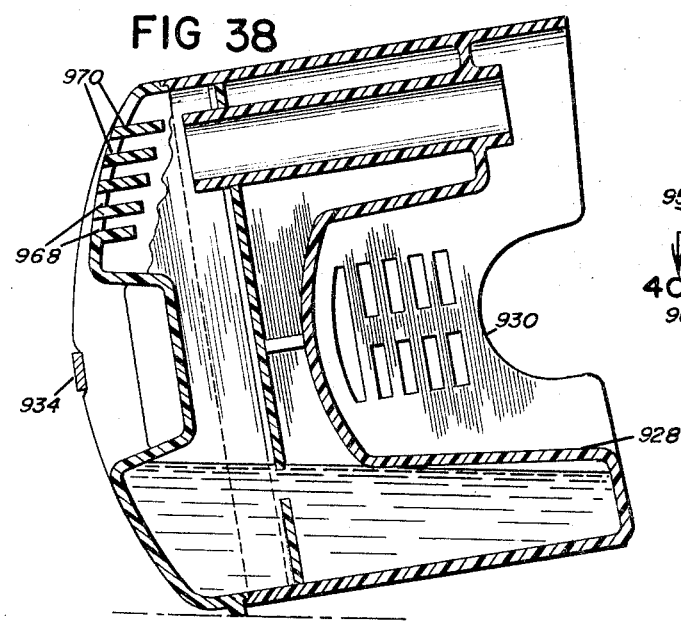
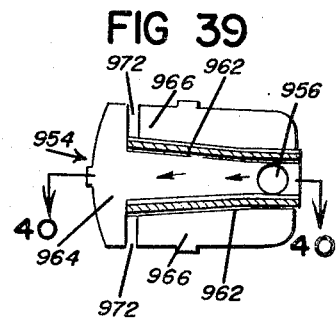
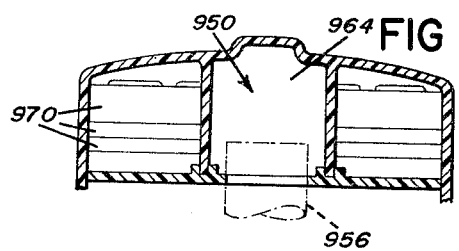
Aaron H. Smith
INVENTOR
BY *Jacobi & Davidson*
ATTORNEYS United States Patent Office 3,316,579
Patented May 2, 1967

3,316,579
APPARATUS FOR SELECTIVELY POLISHING, SCRUBBING AND CLEANING FLOORS
Aaron H. Smith, Ipswich, Mass., assignor to Signal Manufacturing Company, Salem, Mass., a corporation of Massachusetts
Filed Jan. 30, 1964, Ser. No. 341,185
50 Claims. (Cl. 15—320)

This invention relates to apparatus adapted to selectively receive floor polishing, scrubbing and cleaning attachments thereon. Specifically, the present invention is concerned with apparatus of the so-called "floor polisher type" which selectively can be used also to (1) automatically provide a foamed cleaning agent such as is useful in cleaning carpets, and/or (2) to automatically provide a vacuum liquid pickup for removing accumulated dirty liquids, for example, from a floor which has been cleaned therewith.

"Floor polisher" type machines have come into widespread commercial and household use in recent years, and particularly since the advent of floor polishers which are available to the public at reasonable costs. One of the most common forms of such floor polishers includes a base frame having a pair of brush elements received on shafts depending from the base frame and having a motor and associated means for driving the brushes in respectively opposite directions. The present invention finds particular utility when employed in and on such a basic arrangement, and thus the invention is discussed in particular connection with such an arrangement. Still, it is to be understood that the invention can be applied to differing forms of apparatus.

With the basic type of apparatus described above, as well as with variations thereon, the rotating brushes, when in operation, act to effect a polishing, cleaning, or even scrubbing operation. For example, it has been suggested previously that a receptacle or container be provided on the apparatus, and supported on the handle thereof. If a polishing operation is to be performed, liquid wax or the like can be dispensed from the container and through a suitably disposed tube onto the surface engaged by the brushes. Alternatively, if a scrubbing operation is to be performed, the container supported on the apparatus can be at least partially filled with a cleaning solution which would then be dispensed in much the same manner as the wax. Even further, and as an additional alternative, if a carpet or the like was to be cleaned, then the container might be at least partially filled with a solution which is foamable when subjected to the action of the rotating brushes in engagement with a carpet, and such solution would be dispensed onto the carpet.

The advantages which are afforded by the versatility of an apparatus such as described above have no doubt resulted in the substantial widespread acceptance thereof. Still, certain disadvantages and inconveniences are encountered in the use of such equipment.

For example, in a carpet scrubbing operation, where the foamable liquid solution is dispensed directly onto the carpet, the carpet tends to become more saturated with fluid in certain places than in other places. There is thus not only an uneven wetting of the carpet, but there is often a difference in the effective cleaning of differing areas. Moreover, in floor scrubbing operations, for example, even though the scrubbing may be efficient on a common floor covering such as linoleum, asphalt tile or the like, the operator or user is still burdened with the arduous final tasks of removing the cleaning solution from the floor as, for example, by a sponge, mop or the like. There thus remains a need for a floor polishing type apparatus capable of polishing, scrubbing and cleaning operations as prescribed above, and in addition, also capable at least of dispensing efficiently a foamable liquid, and preferably also capable of performing a vacuum liquid pickup operation.

Aside from the need for a floor machine which embodies the operational advantages considered above, there are certain construction aspects of particular significance. Specifically, consistent with the latest requirements for approval of electrical arrangements, there is a need for constructing the electrical operating components of such an apparatus in such a manner as to prevent any accidental short circuiting of the components as by exposure thereof to spilled liquids. In this regard, the operating switch mechanism and electrical drive motor unit incorporated in the apparatus should be so designed as to permit simple assembly of the apparatus, and yet simultaneously so constructed as to prevent spilled liquids from entering cavities, pockets, or housings wherein exposed wires and the like are located.

The present invention has as its primary object the provision of a so-called "floor polishing" type apparatus which satisfies all of the needs discussed above by employing simple yet efficient means, arrangements and/or sub-assemblies. Even though the preferred apparatus embodies cooperating components which permit a user to easily realize all of the advantages afforded by the invention, certain aspects of the invention are individually applicable to machines which embody only one selected combination or one selected group of combinations provided by the invention. Thus, while the invention is presented herein in its entirety with all of its integrated and cooperating mechanisms and arrangements, it is convenient for discussion purposes, and for purposes of facilitating a comprehension of the invention, to explain the objects of the invention and the structural arrangement of particular combinations somewhat separately.

Turning first to the foaming arrangement, it is a primary object of the present invention to provide, in a floor polishing type apparatus, a method of foaming and the means for carrying out the foaming operation whereby foamable liquid is automatically prefoamed by the apparatus and supplied, as a foam, rather than as a liquid, to the periphery of the apparatus brushes so as to thereby (1) render a foam cleaning operation equally effective and efficient over differing areas, and (2) eliminate the previously experienced somewhat common liquid saturated spots encountered with available apparatus. In this regard, it is a further object of the present invention to provide such an apparatus wherein no additional fan is required and wherein the foamable cleaning solution can be easily carried in a container supported on the apparatus and readily and controllably fed through a foaming station to the periphery of the brushes of the apparatus.

Consistent with the preceding objects still further general important objects hereof are: (1) to provide an apparatus wherein the foaming operation is carried out by utilizing the exhaust stream available from the conventional motor cooling fan to foam the solution; (2) to provide such an apparatus wherein the foamable solution and the exhaust air stream from the motor fan are directed through the base of the apparatus and into a dolly removably secured to the apparatus, which dolly has a foaming chamber therein and distribution channels thereon leading from the foaming chamber to the periphery of the respective brushes; (3) to provide such an apparatus wherein the distribution of foam, as supplied to the brushes, is comparatively even notwithstanding differing distances of the brush peripheries from the foaming chamber; (4) the provision of such an apparatus wherein a most efficient foaming operation is achieved through the utilization of warm air without requiring additional heating means or the like to generate the heat applied to the air; (5) the provision of a warm air prefoaming technique as prescribed wherein an even dispersal of foam particles is achieved by employing a simple foraminous mixing means such as a conventional screen disposed across a hollow chamber in the path of fluid moving therethrough; and (6) the provision of such a mixing arrangement wherein adequate prefoaming is absolutely insured by passing the foam ingredients (specifically the warm air and foamable solution) through a Venturi throat before directing the same onto the foraminous mixing screen.

Aside from the preceding more general objects of the instant invention, important auxiliary and specific objects hereof include: (1) the provision of an easily formable channel means which can be readily associated with a conventional motor housing so as to direct the exhaust stream therefrom to and through a foaming chamber to cause the prefoaming operation with warm air; and (2) the provision of such a channel means which is adapted to receive and direct an air stream which has been drawn over the motor of the apparatus by a conventional cooling fan associated therewith into a mixing chamber for use in forming a prefoamed substance ultimately delivered to the side periphery of the brushes of the apparatus above the floor level, whereby the foam is supplied to the brushes without accumulating on the floor surface being operated upon and through the use of available moving components and available air streams produced thereby.

As indicated above, a preferred form of apparatus constructed in accordance herewith provides for the automatic pickup and accumulation of liquids encountered on a floor. To this end, it is a general object of the present invention to provide a floor treating apparatus which is adapted to selectively receive floor polishing, scrubbing and cleaning components, and which further is adapted to automatically, through the use of a vacuum, pick up water or other liquid from a floor and accumulate the same in the apparatus for subsequent disposition as desired. Consistent with the preceding object, it is an even further, yet particularly significant object of the present invention to provide such an apparatus including a pickup container, a pickup attachment, and an auxiliary fan means driven by the same motor as other driven apparatus components, which auxiliary fan means causes water pickup as well as water delivery to a storage container.

In regard to the liquid pickup means, there are certain further, yet more specific objects of the invention including: (a) the provision of an apparatus consistent with the immediately preceding objects wherein the auxiliary fan means takes the form of a centrifugal fan driven by the same motor as utilized for the drive of other attachments, such as brushes or the like; (b) the provision of such an apparatus wherein the auxiliary fan means includes a housing forming part of the base frame for the overall apparatus, and having an inlet and an outlet at respectively spaced apart locations whereby a wiper type pickup dolly can be removably secured to the apparatus in communication with the inlet and whereby a container can be associated with the apparatus in communication with the outlet of the housing such that the fan causes liquid picked up from a floor to travel through the pickup dolly or attachment and into the container removably carried on the apparatus for receiving the liquid delivered thereto; (c) the provision of such an apparatus which is adapted to receive other dolly means associated with the inlet to the auxiliary fan housing so as to essentially remove the vacuum from the effective working area of the apparatus when it is desired to carry out some operation such as a polishing operation or a foaming operation where the vacuum is not desired; and, (d) the provision of such an apparatus wherein the container provided for storing the pickup liquid until its ultimate disposition is so constructed as to permit tipping of the apparatus during use to change attachments associated therewith without permitting any spilling of liquid which has been delivered to the container.

The provision of a "spill-proof" container for use with such an apparatus is in and of itself an important object hereof. In this connection, further significant objects of the present invention include: (a) the provision of such a container which is adapted to be supported on the base frame means of the apparatus and in non-interfering relation to the handle assembly coupled therewith; (b) the provision of such a container which is so designed as to minimize the space required for collecting the water picked up by an apparatus associated therewith, and thus so constructed as to yield no substantial increase to the size or bulk of the overall apparatus; (c) the provision of such an apparatus which is adapted to receive liquid therein which is entrapped in an air stream, and to effectively separate the liquid from the air and permit or cause the air to escape with the liquid remaining in the container; (d) the provision of such a container and locking means associated therewith that cooperate with the handle assembly of the apparatus so as to automatically cause the container to be locked in position by swinging movement of the handle assembly without requiring hand manipulation of the locking means itself; and (e) the provision of such a container which meets all of the aforesaid objects and yet permits tilting of the apparatus both to change attachments or dollies associated therewith and to enable the apparatus to be moved close to obstacles such as baseboards or the like to remove fluid thereadjacent.

It should here be remembered that while the prefoaming techniques and means provided hereby are significant individually, and while the water pickup techniques and means associated herewith are also individually important, the provision of an apparatus incorporating both such techniques and means constitutes a particularly important object hereof.

Turning now to the motor means provided in accordance herewith, it is an important object hereof to provide a motor assembly including a motor housing, a motor disposed therein, and a fan disposed therein driven by the motor, wherein the housing is so constructed as to permit air flow therein only through a series of labyrinth passages, at least a portion of each of which is vertically disposed, whereby when liquid, such as water, is accidentally spilled on the motor housing, the same cannot find its way into the housing and the motor therein during normal operation. Still further, in this regard, the invention has additional objects, including: (a) the provision of such a motor assembly wherein the motor housing comprises a base section and an upper cover section, the upper free edge of the base section having recesses and projections thereon and the cover section having a depending skirt and also having recesses and projections thereon which cooperate with the recesses and projections on the base section to provide the labyrinth passages; (b) the provision of such a motor housing which includes air outlets disposed adjacent the motor cooling fan whereby air can be drawn in through the top portion of the housing and over the motor, and then directed outwardly by the fan at the lower end of the housing; and (c) the provision of such a motor assembly wherein a drive shaft projects through the motor housing and has the fan carried thereon with the drive shaft being adapted to be associated with drive gear means in a conventional manner to drive, for example, brushes associated with the apparatus.

A further important object of the present invention is to provide a motor switch control arrangement which insures against subjecting exposed connections therein to liquids even in the event of an accident. In this regard, specific objects of the present invention include: (a) the provision of a switch assembly having a separable section switch housing disposed in a handle-grip associated with the apparatus in such manner that the cooperating components effectively provide double insulation against any liquid or the like traveling into the switch housing and contacting exposed components therein; (b) the provision of such a switch assembly wherein the switch housing carries a simple switching means which can be easily constructed according to mass production techniques; and, (c) the provision of such a switching arrangement in combination with a handle assembly which is so designed as to essentially hide connections between the switch assembly and the electrical components controlled thereby so that only a cord projects from the handle of the apparatus for purposes of connection with a conventional wall outlet or the like.

Turning now more specifically to the overall apparatus hereof, it is an important object to provide an overall arrangement: (1) which selectively permits liquid pickup; (2) which selectively permits a prefoamed output and consequent effective carpet or rug scrubbing operations; (3) which selectively permits conventional scrubbing operations such as achieved with soap and water or other cleaning solutions; (4) which selectively permits polishing operations; and (5) which permits other operations of like type. To this end, it is an object hereof to provide such an apparatus wherein a liquid pickup container, as well as an additional container can be easily supported on the apparatus all without substantially increasing its size or bulk. Consistent with this latter object, further objects of the invention include: (a) the provision of a handle assembly in an apparatus of the type prescribed, which handle assembly includes platform means and spaced retaining means for selectively supporting a desired container thereon whereby the same is pivotably movable therewith from a position above a water pickup container to a position to one side thereof; (b) the provision of such a handle assembly wherein the container associated therewith can be selectively opened and closed, as supported on the handle assembly, through cooperating valve means associated with the container and an operating trigger assembly for the valve means carried at the upper end of the handle assembly so as to be easily manipulated by a user; and (c) the provision of such an apparatus wherein the output from the container carried on the handle assembly passes through conduit means which are not exposed to view and to a desired location in and or on the base frame of the assembly so as to be delivered to a floor, to brushes associated with the base frame, and/or mixed with an air stream prior to delivery to the brushes.

Although the preceding discussion of the objects of the present invention exemplify the multiple aspects of the invention and the diverse applications to which an apparatus constructed in accordance herewith can be put, the general and basic objects of the invention can be simply phrased as follows: (1) to provide an apparatus of the floor polisher type such as now commercially available, but which, with the use of the conventional motor cooling fan, further permits the user to selectively achieve prefoaming of foamable liquids used with the apparatus: (2) to provide such an apparatus which even further permits the user to achieve water pickup; and, (3) to provide such an apparatus wherein the additional parts required to achieve the additional results are minimized and the control components and drive components are so constructed and arranged as to effectively provide double insulation against any possible short circuits which may otherwise be encountered.

The invention lies in certain basic combinations, arrangements and sub-combinations, and will be better understood when consideration is given to the following detailed description. Such description makes reference to the annexed drawings presenting preferred and illustrative embodiments hereof.

In the drawings:

FIGURE 1 is a front elevational view of an exemplary type of floor polisher with which at least one embodiment of the invention can easily be associated;

FIGURE 2 is a side view, partially broken away and partially in section, of the base frame means of the apparatus of FIGURE 1, FIGURE 2 presenting such base frame means as it would appear when constructed in accordance herewith and when a dolly means is releaseably associated therewith in accordance with the invention;

FIGURE 3 is a bottom view of the arrangement shown in FIGURE 2;

FIGURE 4 is an elevational view of a flow directing means provided in accordance with the invention and incorporated on the base frame means as shown in FIGURE 2;

FIGURE 5 is a fragmental sectional view taken on the line 5—5 of FIGURE 2 and showing the preferred form of prefoaming mixing chamber arrangement utilized in accordance with the embodiment of FIGURES 1–4;

FIGURE 6 is a fragmental view, partially in section, presenting the disposition and arrangement of a brush and the outlet portion of a prefoaming chamber arrangement such as shown in FIGURE 5;

FIGURE 7 is a fragmental sectional view of an end portion of a modified flow directing means constructed in accordance herewith;

FIGURE 8 is a bottom view of the bottom wall of the base frame means of the apparatus shown in FIGURE 1, FIGURE 8 presenting such wall with both the brushes and dolly means removed from the apparatus;

FIGURE 9 is a side elevational view of a floor treating apparatus constructed in accordance herewith and embodying both prefoaming means and water pickup means;

FIGURE 10 is a transverse sectional view of the base frame means of the floor treating apparatus shown in FIGURE 9, but with prefoaming dolly means associated therewith;

FIGURE 11 is an exploded view of portions of the base frame means shown in FIGURE 10 and of the prefoaming dolly means used therewith;

FIGURE 12 is a bottom view of the base frame means and associated dolly means shown in FIGURE 10;

FIGURE 13 is a bottom view of the base or frame section of the prefoaming dolly means shown in FIGURES 11 and 12;

FIGURE 14 is a top view of a cover section associated with the base or frame section shown in FIGURE 13;

FIGURE 15 is a bottom view of the base frame means shown in FIGURE 10 but with both dolly means shown therein removed, and with the forward dolly means replaced by another support dolly;

FIGURE 16 is a fragmental transverse sectional view of a water pickup dolly means, as associated with the forward portion of the base frame means shown in FIGURE 10;

FIGURE 17 is an elevational view of the water pickup dolly means presented in section in FIGURE 16;

FIGURE 18 is an elevational view of a supporting dolly means such as the dolly means shown in section in FIGURE 10 and associated with the forward portion of the base frame means;

FIGURE 19 is a bottom plan view like FIGURE 15 of the base frame means of FIGURE 10, but with the forward dolly means of FIGURE 15 and the base frame cover plate of FIGURE 15 removed;

FIGURE 19a is a plan view of the normal top side of the base frame cover plate associated with the base frame means of FIGURE 19;

FIGURE 20 is a bottom view of the base frame means shown in FIGURE 10 but with brushes mounted on the apparatus and with the front and rear dolly means of FIGURE 10 removed and replaced respectively by a support dolly means and a squeegee;

FIGURE 21 is a fragmental elevational view of the apparatus shown in FIGURE 9, but with the handle assembly thereof pivoted to a lateral position with respect to the base frame means;

FIGURE 22 is an elevational view of the base frame means and lower portion of the handle assembly of the apparatus shown in FIGURE 9, but with the storage container removed;

FIGURE 23 is a fragmental detailed sectional view of a socket arrangement and connecting conduit associated with a platform carried on the handle assembly of an apparatus constructed in accordance with the embodiment of FIGURE 9;

FIGURE 24 is an end elevational view of a storage container associated with the apparatus of FIGURE 9, FIGURE 24 showing the bottom end of such container;

FIGURE 25 is a fragmental detailed sectional view of an outlet valve means provided in the container of FIGURE 24;

FIGURE 26 is a rear elevational view of the container shown in FIGURE 24, FIGURE 26 presenting the actuating arm for the valve means in such container and the inlet to the container;

FIGURE 27 is a top view, partially in section, of the base frame means of the apparatus of FIGURE 9, FIGURE 27 showing the pivotal connection thereon for the handle assembly of the apparatus;

FIGURE 28 is a longitudinal sectional view taken through the handle grip assembly provided on the apparatus of FIGURE 9;

FIGURE 29 is an elevational view, partially broken away, of the switch means provided in accordance herewith and utilized in the handle grip assembly of FIGURE 28;

FIGURE 30 is a longitudinal enlarged view taken through a motor and fan assembly constructed in accordance herewith, FIGURE 30 presenting the air inlet arrangement for such housing provided hereby, FIGURE 30 being partially broken away;

FIGURE 31 is a transverse sectional view taken on the line 31—31 of FIGURE 30;

FIGURE 36 is a side elevational view of the apparatus of FIGURE 32 as tilted over onto one side thereof so as to give access to the bottom of the apparatus for changing brushes, dollies, or the like;

FIGURE 37 is a vertical sectional view through the receptacle of FIGURE 32, but to a larger scale;

FIGURE 38 is a vertical sectional view corresponding to FIGURE 37 but showing the receptacle as tilted to one side thereof—i.e., with the receptacle in the same position as illustrated in FIGURE 36;

FIGURE 39 is a plan view, to a very much smaller scale, of baffle plate means incorporated in the pickup receptacle provided by the present invention and shown in FIGURES 32-38;

FIGURE 40 is a sectional view taken on the line 40—40 of FIGURE 39;

FIGURE 43 is a bottom plan view of another section of the switch means of FIGURE 29.

Figure 41:
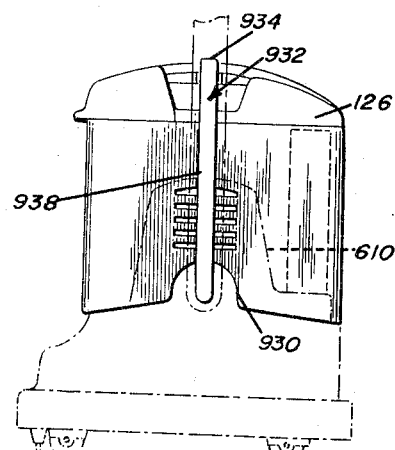
FIGURE 41 is a side elevational view of that portion of the apparatus shown in FIGURE 32; and, FIGURE 42 is a top plan view of one section of the switch means of FIGURE 29.
Figure 32:
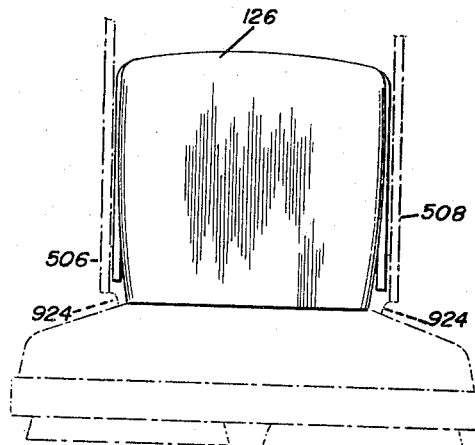
FIGURE 32 is a front elevational view of the apparatus of FIGURE 9, showing the base frame means and lower portion of the handle assembly in dotted lines and the pickup receptacle provided hereby in full lines.

An overall apparatus embodying the invention can be constructed in various different manners. By way of example, the overall apparatus may take a form such as shown in FIGURE 1, or alternatively, it may take an overall form such as shown in FIGURE 9. In either instance, and as explained more fully below, the apparatus is adapted to selectively receive floor polishing, scrubbing and cleaning attachments thereon. As will become apparent from the following description, the apparatus of FIGURE 9 affords certain advantages over the apparatus of FIGURE 1 even though both forms of apparatus incorporate embodiments of the invention. Specifically, the apparatus of FIGURE 9 not only achieves a prefoaming operation in accordance herewith, but it additionally permits the user to effectively pick up water or other liquid from a surface.

Notwithstanding the differences in the respective embodiments which will be described in considerable detail below, it is helpful for a basic understanding of the invention to initially consider a basic embodiment hereof, and thus, the embodiment of FIGURE 1 is discussed at the outset.

By referring to FIGURE 1, it will be noted that the apparatus shown therein is generally designated by the numeral 2. Such apparatus includes a frame means 4, such frame means in turn comprising a base frame section 6 and a handle assembly section 8 pivotally mounted with respect to the base frame section 6. The handle assembly section 8 supports a container 10 thereon and has an upstanding arm portion 12 leading to a suitable handle grip (not shown) to be grasped by the user.

The underside of the base frame section 6, as shown in FIGURE 8 comprises a bottom wall 14 with an opening 16 therein. The bottom wall 14 has a pair of shafts 18 and 20 journaled therein and depending therefrom. These shafts are adapted to receive floor-engaging brushes thereon. The bottom wall 14, moreover, has a pair of posts 24 and 26 projecting therefrom. These posts, as explained in more detail below, serve to frictionally receive sockets in a dolly means adapted to be releaseably attached to the base frame 6 in at least centrally underlying relation to the bottom wall 14.

The base frame means 6, as shown in FIGURE 2 includes, in addition to the bottom wall 14, a housing 28. Mounted within the housing 28 is a motor housing 30. A motor and a fan means driven by the motor for drawing air across the motor are disposed within the motor housing 30.

While the motor housing 30 has certain particular features provided in accordance with the present invention, the motor and fan means are generally conventional. Accordingly, in FIGURE 2, the phantom block 32 is shown as indicating the motor, and the phantom block 34 is presented as indicating the fan means. The fan means is essentially a normal cooling fan, and the housing 30 has air inlets 36 in the upper portion thereof and at least one air outlet such as the air outlet 38 in the lower portion thereof so that, with operation of the motor and fan means, air is drawn into the housing 30 through the inlets 36, then such air flows across the motor and finally the air is forced outwardly through the outlets 38, only one of which is shown.

In accordance with the invention, a flow directing means, such as the flow directing means 40 shown in FIGURE 4, is associated with the motor housing 30 for purposes of directing the air stream leaving the motor housing from the outlets 38 to a desired location. Since this air stream passes over the motor in operation, the air in the stream is heated by the heat transferred thereto from the motor.

Consistent with this embodiment, the flow directing means 40 is a channeled member having a circular portion 42 and a depending arm portion 44. The circular portion 42 is in the form of an interiorly opening channel, whereas the arm portion 44 has a closed channel section 44a leading into a terminal open bottom housing section 58. The circular portion 42 includes a side wall 46 and inwardly extending upper and lower ring flanges 48 and 50 integrally joined with the outer side wall 46. The closed channel section 44a of arm portion 44, on the other hand, is effectively a closed tube which leads tangentially into the wall 46 through the tangential opening 52 in side wall 46. The closed tube section of portion 44 leads from opening 52 outwardly and downwardly of the circular portion 42 to the terminal housing section 58, as possibly best shown in FIGURE 2.

The circular portion 42 of flow directing means 40 is dimensioned to peripherally surround the lower end of the motor housing 30 so as to encircle the air outlet 38, or any similar air outlets disposed about the periphery of the housing 30. Thus, during operation of the motor and fan means associated therewith, the air which is drawn in the housing 30 at the upper end thereof, passes over the motor and outwardly through the outlets 38, into the flow directing means 40, initially encountering the circular channel portion thereof. The outer wall of the motor housing 30 effectively forms the inner wall for a closed channel about the lower periphery of the motor housing, and thus the air is directed about such channel and through the tangential opening 52 into the arm portion 44 of the flow directing means 40.

To those familiar with the art, it will be apparent that a gear drive means is utilized between the drive motor and the shafts 18 and 20 which drivingly receive the rotatable brushes thereon. In the arrangement shown in FIGURES 1 through 9, such a gear means is utilized. Thus, the apparatus, as shown in FIGURE 2, includes a gear housing 110 on which the motor housing 30 is disposed. The circular channel part 42 of the flow directing means 40 rests on top of the gear housing, and the arm portion 44 thereof extends outwardly and downwardly to one side thereof.

From the preceding description, it should be understood that consistent with the invention, the warmed air outflow normally existent at the outlet of the motor housing has been trapped by the flow directing means 40 and then directed downwardly to a given location. This warm air stream as so trapped and directed is used, in accordance herewith, for purposes of prefoaming a foamable liquid, if desired.

To this end, the outer portion of the arm 44 is formed as an open body housing 58 (FIGURES 4 and 5). The housing 58 is received on an upstanding flange wall 56 extending about a recess 55 in the base wall 14 of the frame means 6. Thus, as shown in FIGURE 5, the open body housing portion 58 and the flange wall 56 define together a mixing chamber 54. Air passing from the outlet 38 of the motor housing 30 is directed to such compartment through the arm portion 44. Foamable liquid, carried, for example, by the container 10 (FIGURE 1) is directed therefrom through a suitable tube such as the tube 60 (FIGURE 2) which leads to a fluid inlet coupling 62 carried on the housing portion 58.

The container 10 may well have a valve means therein controllable through a trigger disposed at the upper end of the handle assembly, and moreover, the tube 60 leading from the container can, in fact, lead from a socket cooperating with an outlet in the container. The particular details of the construction in this regard, insofar as the embodiment of FIGURE 1 is concerned, are not important. Instead, it is sufficient to understand for purposes of the present description, that a foamable liquid is easily carried by the apparatus in a suitable container and that such fluid can be led from the container to the fluid inlet coupling 62 which joins with the connecting conduit such as the conduit 60.

Thus, regardless of the particular connections, a foamable liquid can be fed to the mixing chamber 54 through the fluid coupling 62, and warm air from the motor housing 30 is fed to such chamber through the arm 44. Mere mixing in the chamber 54, however, does not produce the foaming as desired. Accordingly, additional means for prefoaming the liquid are provided.

Specifically, a dolly 64 (FIGURES 2 and 3) is releasably secured in underlying relation to the bottom wall 14. The dolly 64 includes a frame 66 having front and rear wheel assemblies 68 and 70 and an upwardly offset horizontal central portion 72. The central portion 72 has a pair of sockets 74 and 76 therein which frictionally receive the posts 24 and 26 respectively depending from the wall means 14. With the particular arrangement shown in FIGURE 2, the dolly 64 is so dimensioned that the wheel assemblies 68 and 70 extend outwardly of the depending skirt wall 29 disposed at the base of the housing 28. The dolly 64 thus supports the base frame means 6 above a surface with the ground-engaging wheels 68a and 68b supporting the forward portion of the apparatus on a floor, and with the ground engaging wheels 70a and 70b supporting the rear portion of the apparatus on a surface.

In essence, the dolly means 64 serves as a wheeled platform on which the base frame means 6 and in turn the other components of the apparatus, are supported. The dolly means 64, however, preferably only covers the central portion of the base frame means 6 or specifically, the bottom wall 14 so that the depending brush shafts 18 and 20 are exposed on opposite sides of the dolly means as shown in FIGURE 3.

The dolly means 64 and the base wall 14 carry cooperating components to effectuate the prefoaming operation referred to above. By referring to FIGURE 5, it will be noted that a coupling collar or sleeve 80 depends from bottom wall 14. The dolly means 64, on the other hand, carries a mixing housing 88 which is open at its upper end 90 so as to frictionally receive the coupling collar 80.

The housing 88 is formed with a shoulder 96 therein, and on the shoulder 96, a foraminous screen 98 is supported so as to extend across the mixing chamber 94 within housing 88. Preferably, housing 88, as shown in FIGURE 5, includes an upper section 88a and a lower section 88b. The upper section 88a preferably comprises a depending sleeve integrally formed with the dolly means 64 on the central section 72 thereof. Such sleeve has an inwardly extending transverse downwardly tapered wall 81 therein which is open centrally to define a Venturi throat 84 above screen 98. The lower section 88b preferably takes the form of a cup received on the depending sleeve forming section 88a, the cup and the sleeve being respectively recessed so as to form a tight joint as at 95. The cup has an interior diameter which is slightly smaller than the interior diameter of the section 88a, thus providing the shoulder 96 which supports the screen 98. The cup member, moreover, is formed with a pair of outlets 90 and 92 (FIGURE 3) in the lower end thereof. The screen 98, as so supported, is disposed in the flow path of fluid entering the chamber 94 through the Venturi throat 84.

Now, when the dolly 64 is supported on the apparatus in the manner described, and with the centering being achieved through the cooperation of the sockets 74 and 76 with the depending posts 24 and 26, the apparatus is essentially ready to perform the prefoaming operation. It will be understood from the preceding discussion that the dolly 64 is so dimensioned and supported in position as to provide for the accurate centering and proper disposition of the housing 88 with respect to the depending coupling collar 80. It will be further understood that once the dolly is in place, and prior to performing the prefoaming operation, one would normally couple rotary scrubbing brushes such as the brushes 100 and 102 (FIGURE 1) on the depending shafts 18 and 20 (FIGURES 2 and 3). This coupling operation and the provision of the brushes is generally conventional and, therefore, detailed description of this aspect appears unnecessary.

Suffice it to say that once the dolly 64 is in place, and once the brushes are in place, the apparatus can be operated for the prefoaming operation. To this end, the motor would be started, and the fan means would be driven. As a result, a warm air stream would be directed out through the outlet 38 in the motor housing 30 and then into the channeled member forming the flow directing means 40. The air stream would enter the chamber 54 through the arm portion 44. The operator would cause fluid to enter such chamber through the coupling 62, the air and the fluid mixing in the chamber 54 and then passing downwardly through section 88a and into the Venturi throat 84, such throat effecting a good mixture therebetween. The mixture of air and liquid then enters the chamber 94 and encounters the transverse partition screen 98. The efficient mixture of the warm air and the liquid and the passing thereof through the screen 98 results in a foaming of the liquid. Thus, the portion of the chamber 94 below the screen 98 receives a foam material. This foam is directed outwardly through the outlets 90 and 92 in the lower portion of the chamber 94. If reference is made to FIGURE 6, it will be noted that the outlet 90 leads onto the side periphery of the brush 100 above the lowermost surface 100′ thereof which is engageable with a floor surface. Thus, the foam is supplied to the side periphery of the brush above the lower surface of the brush whereby the foam must pass on or through the brush before reaching the surface being engaged thereby. In this manner, the foam material is not deposited directly on the floor but instead is first deposited on the brush and then onto the floor.

While not specifically described above, it is to be noted that the dolly means 64 has a pair of arcuate skirt members or walls 104 and 106 depending therefrom. The skirt members are of circularly arcuate contour and converge inwardly and centrally of the dolly means 64. The skirt members 104 and 106 depend from horizontal central portion 72. The skirt members tend to direct the foam forwardly about the brush—i.e., in the direction of rotation thereof.

By utilizing the existent motor and fan means such as found on a conventional rotary brush floor polisher, and by simple arrangement of a dolly means associated therewith, a foamable material can be easily prefoamed automatically by the apparatus hereof. In fact, the arrangement is quite simple because the flow directing means 40 which takes the form of a channeled member can be associated with a conventional rotor housing having outlets therein so as to direct the air to a given location. The bottom wall of the frame means of the apparatus need merely be modified to have an opening therein through which the air is to be directed. Any suitable conduit can be associated with the inlet coupling 62 carried on the housing portion 58 of the arm 44 of the flow directing means 40.

In the particular embodiment shown, it is assumed that a container such as the container 10 (FIGURE 1) is carried on the apparatus, and that an internal conduit is associated therewith. However, with certain applications, the container associated with the apparatus may take the form of a can which is merely attached to a handle rod. In this instance, the conduit leading therefrom may travel exteriorly of the apparatus. To facilitate a coupling of such conduit with the means provided hereby, the housing portion 58 of the arm 44 may be modified as shown in FIGURE 7. In this instance, the housing portion 58′ has two fluid inlet couplings, 62′ and 63′. The inlet coupling 62′ corresponds to the inlet coupling 62, but the inlet coupling 63′ is an auxiliary coupling which would normally face outwardly of a side wall of a base frame housing, such as the base frame housing 28 of FIGURE 2. If an external conduit is to be used, then the inlet coupling 62 may well be plugged as by a plug 62a, and the base frame housing 28, for example, might well be provided with an aperture in a side wall thereof so that a conduit leading from an auxiliary container could be passed within the housing and onto the auxiliary fluid coupling 63′. The invention is thus readily adaptable for use with existing equipment, as well as with new apparatus constructed in accordance with the invention.

The prefoaming system described above is, in its basic aspects, also incorporated in the embodiment of FIGURE 9. As indicated above, however, the embodiment of FIGURE 9 further includes means for picking up liquid from a given surface over which the machine is moved. The manner in which the combination of these respective features is achieved, as well as the detailed construction of the embodiment of FIGURE 9, will be better understood from the following description.

By referring to FIGURE 9, it will be noted that the apparatus shown therein is generally designated by the numeral 120. Such apparatus includes a base frame means 122 and a handle assembly 124 which is pivotally mounted with respect to the base frame means. Supported on the base frame means is a container 126, and supported on the handle assembly 124 is a further container 128.

A handle grip 130 is carried at the upper end of the handle assembly 123, and suitable wheels 131 are carried on the base of the frame means 122. The apparatus is thus adapted to be moved over a floor for performing various operations thereon.

To understand the manner in which the arrangement of FIGURE 9 corresponds to the embodiment of FIGURE 1, it is helpful to initially consider the cooperating means and components provided for the prefoaming operation. To this end, attention is initially directed to FIGURE 10 wherein it will be noted that the base frame means 122 includes a bottom wall or wall means 124 having an upstanding flange wall 127 defining the lower part of a gear housing 129. The upper part of the gear housing 129 is defined by a gear housing section 131 including a top wall portion 132 and a depending skirt wall portion 135.

Disposed in supported relation on the top wall 132 is a motor housing 134 which is closed by a cover member 136. The motor housing 134 has therein a motor 138 with a vertically disposed depending motor shaft 140. Mounted on the depending shaft 140 inwardly of the lower end thereof is a fan 142. The particular manner in which the motor 138 is supported within the housing 134 can take various conventional forms, and suffice it to say that the important consideration to the instant invention is that the motor 138 and fan 142 are so associated, preferably within a common housing, that the fan 142 causes air to be drawn in through the inlets 144 in the housing 134 and then passed over the motor and to and by the fan.

The motor housing 134 has an integrally formed channel part 146 at the lower end thereof, which channel part includes a generally circular chamber portion 148 surrounding the fan 142 and a depending passageway tube portion 150 disposed to one side of the skirt wall 135 so as to form a passageway 152 leading to an outlet coupling tube 154 extending upwardly from the base wall 124.

With the described construction, when the motor 138 is operated, the motor shaft 140 is in turn drivingly rotated, and accordingly the fan 142 fixed thereon is rotated. This operation results in drawing air through the inlets 144 in the motor housing 134 and over the motor and past the fan into the chamber portion 148 and then downwardly through the passageway 152. There is thus a warm forced air stream provided through the base wall 124 of the base frame means 122. The coupling tube 154 surrounds an opening 156 in the bottom wall 124, and similarly, a coupling tube 158 surrounds a further opening 160 in the bottom wall 124. The tube 160, as explained more fully below, communicates with the container 128 (FIGURE 9) so that foamable liquid selectively can be delivered through the tube 158 and the opening 160 to the underside of the bottom wall 124.

It will be noted that while there are specific structural differences between the embodiment of FIGURE 1 and the assembly thus far described for the embodiment of FIGURE 9, there are also certain common basic means, components or arrangements. Specifically, in both instances, the base frame means has a bottom wall or wall means with an opening therein, a motor is mounted on the frame means and a fan means driven by the motor is incorporated for drawing air across the motor. Furthermore, in both instances, passageway means are provided for directing through the opening in the bottom wall, the air which has been drawn across the motor by the fan means. In the embodiment of FIGURE 9, the air stream is directed through the bottom wall prior to mixing thereof with the foamable liquid, but still, as will be now explained, in this embodiment, as in the embodiment of FIGURE 1, a dolly attachment can be mounted on the bottom wall or wall means to receive the forced air stream and create a foam for delivery to the periphery of associated brushes.

Specifically, when it is desired to perform a prefoaming operation with the embodiment of FIGURE 9, a dolly means, such as the dolly means 162 shown in FIGURE 11 is coupled with the base frame means. By referring to FIGURE 11, it will be noted that the dolly means 162 takes the form of a frame or base 164 having a sleeve 166 extending upwardly therefrom. The sleeve 166 carries a funnel 168 at the upper end thereof, such funnel having an upper edge 170 adapted to mate with the underside of the bottom wall 124. The funnel 168 is of generally frustro-pyramidal contour, but includes a laterally offset spout extension 172. In operation, the funnel 168, as shown in FIGURE 10, surroundingly underlies both the opening 156 and the opening 160 in the bottom wall 124. The funnel thus receives foamable fluid passing through the tube 158 and the warm forced air stream passing through the passageway 152.

The sleeve 166 has a hollow interior which forms part of a premixing chamber 174 in combination with the funnel 168. The premixing chamber is disposed above, but in communicating relation with an outlet chamber means 176 carried partially in and partially on the underside of the dolly means 162. Supported between the premixing chamber 174 and the outlet chamber means 176 is a foraminous screen 178 which, as shown, is in the fluid flow path between the chamber 174 and the outlet chamber means 176. Thus, the forced air stream entering the funnel 168 through the opening 156 in the bottom wall 124 and the foamable liquid entering the funnel 168 through the opening 160 in the bottom wall 124 initially mix in the funnel 168 and then pass through the lower end thereof onto screen 178. The arrangement of the funnel 168 and sleeve 166 is such as to form a Venturi throat 175 insuring proper and efficient dispersal of the liquid particles within the air stream. The mixture leaving the Venturi throat 175 passes through the foraminous screen 178 and this results in causing the liquid to foam so that the lower portion 176' of the outlet chamber means 176 receives foam, as opposed to merely a mixture of liquid and air. The outlet chamber means 176 includes a pair of outlet conduits 180 and 182 (FIGURES 10, 11 and 12) which, when the dolly 162 is coupled with the apparatus, serve to direct the foam onto the side periphery of the brushes, much in the same manner that the outlets 90 and 92 of the embodiment of FIGURE 3 perform such function.

However, for reasons explained below, the premixing chamber 174, and in turn the outlet chamber means 176 are not disposed, in this instance, centrally of the apparatus. Accordingly, the outlet conduits 180 and 182 are of unequal length—i.e., the distance which each extends from the center portion of the outlet chamber means 176 to the periphery of its associated brush is not the same, the conduit 182 being substantially longer than the conduit 180.

Because of the difference in length of the respective conduits 180 and 182, there is a tendency of the foam which enters the lower portion of the outlet chamber means 176 to travel only through the shortest conduit— i.e., in this instance, through the conduit 180. To eliminate this tendency, and to evenly distribute the foam through the respective conduits 180 and 182, the outlet chamber means 176 is provided with a partition 184 disposed directly under the screen 178. The partition is so mounted in the outlet chamber means 176 as to effectively divide the lower portion thereof immediately under the screen 178 into two equal compartments. Thus, as the foam enters the outlet chamber means 176 through the screen 178, it is directed into alternate compartments, and in turn, with continued operation, forced out of the particular outlet conduit 180 or 182 leading to the respective compartment which it initially enters in the outlet chamber means 176. In this manner, an equal distribution of the foam to the respective brushes is achieved (see FIGURE 14).

FIGURES 11, 12, 13, 14 and 15 best present the detailed construction of the dolly means 162 and the manner in which it is removably received on the bottom wall 124. FIGURE 15 is a bottom view of the apparatus shown in FIGURE 10 with the dolly means 162 removed therefrom. It will be noted that the bottom wall 124 carries a depending elongated but ringlike skirt wall 186 with a central discontinuity or opening therein. Within the confines of such ring wall are a pair of projecting posts 190 and 192. (The posts 190 and 192 are generally similar to the posts 24 and 26 shown in FIGURE 8.)

As also shown in FIGURE 15, the openings 156 and 160 in the bottom wall 124 are disposed adjacent one another, and also adjacent the depending flange wall 186 across the discontinuity or opening therein. Now, as shown in FIGURE 11, the frame or base 164 of the dolly means 162 includes a rear elongated portion 194 which carries about its edges an upstanding flange wall 196. Disposed within the confines of the upstanding flange wall 196 of the dolly are a pair of socket collars 198 and 200. Each of these collars is hollow and has an interior diameter which corresponds substantially exactly with the outer diameter of the posts 190 and 192. Consistent with this arrangement, when the dolly means 162 is to be releaseably supported in position, the same is moved adjacent the bottom wall 124, and then upwardly against the bottom wall with the projecting posts 190 and 192 respectively being received in the respective coupling sockets 198 and 200—the fit between the collars and the posts being a tight frictional fit.

The upper edge 202 of the upstanding flange wall 196 on the dolly is shaped and dimensioned to correspond substantially exactly with the shape and dimensions of the lower edge 197 of the depending flange wall 186 carried on the bottom wall 124. Thus, when the dolly means is positioned with the posts 190 and 192 received in the collar sockets 198 and 200, the upper edge 202 of the flange wall 196 of the dolly means abuts against the lower edge 197 of the depending flange wall 186.

By virtue of such abutment, and the positioning afforded by the cooperating posts and sockets, the upper edge 170 of the funnel 168 abuts against the bottom wall 124 in surrounding relation to the openings 156 and 160 therein. The weight of the apparatus causes an effective seal between the upper edge 170 and the underside of the bottom wall 124—the depth of the funnel 168 and the sleeve 166 being such that the dolly means is positioned with the outlet conduits 180 and 182 thereon extending parallel to the bottom wall 124. It is to be noted that the dolly means 162 carries a pair of wheel units 206 and 208 thereon (FIGURES 12 and 11) which wheel units are disposed on the underside and at opposite ends of the elongated portion 194 of the dolly means. These wheel units serve to support the base of the outlet chamber means 176 slightly above a surface over which the apparatus is being moved. In this regard, attention is again directed to FIGURE 10, from which it will be noted that the wheels 207 of the wheel unit 206 maintains the lower surface 176a above the surface over which the apparatus is being moved.

The wheel units 206 and 208 are provided in addition to rear wheel units 209 which depend from the bottom wall 124 and which are permanently fixed to such bottom wall. The wheel units 209 serve to support the apparatus, as explained more fully below, during a water pickup operation, but are rendered ineffective while a foam scrubbing is to be achieved, and the prefoaming components described above are utilized.

It should be here noted that the forward portion or end of the base frame means 122, or of the bottom wall 124 is supported above the surface being operated upon by further wheel units. These wheel units are carried by an additional dolly means 210 the purpose of which, and the need for which, will become apparent after the water pickup mechanism is understood. Suffice it to say at this point that an additional dolly means such as the dolly means 210 shown in FIGURE 18 is releaseably coupled to the forward end of the bottom wall 124 to properly support the apparatus on a surface with which a foam scrubbing is to be performed, such as, for example, a carpet, rug, or the like.

With particular respect to the outlet chamber means 176 incorporated on the dolly means 162, attention is again directed to FIGURES 10, 12, 13 and 14. As shown and described in connection with FIGURE 10, and also as shown in FIGURE 12, the outlet chamber means 176 includes a pair of outlet conduits 180 and 182. Further, the outlet chamber means 176 includes a central chamber 176′ overlying the bottom wall 183 of the outlet conduit means. To this end, the frame or base of the dolly means 162 is preferably formed from a plurality of sections, including the base section 220 and the cover housing section 222, respectively shown in FIGURES 13 and 14. The base section 220 is recessed to provide chamber 224 therein. Chamber 224 opens at its lower end on the bottom of the base section 220, and is coupled at its top end through sleeve or collar 166 with funnel 168. In practice, the cover section 222 shown in FIGURE 14, is inverted from the position thereshown, and disposed as shown in FIGURE 10 so that the central portion thereof forms the lower chamber 228 in the outlet chamber means—i.e., the chamber below screen 178. The cover piece 232 has a bottom wall 183 and an upstanding outer flange peripheral wall 177. Further, an inner flange wall 179 is integrally formed therewith so that the conduit 180 is defined between one set of parallel portions of the flange walls 177 and 179, and similarly, the conduit 182 is defined between an arcuately displaced set of parallel portions of the respective flange walls 177 and 179. The central area of the cover piece provides the bottom part of chamber 228 having its side walls defined by the arcuate portion of the flange wall 177 and the junction between the respective portions of the flange wall 179. Preferably, the base section 220 is shouldered at 181 in peripherally surrounding relation to the lower end of chamber 224 therein so that a downwardly opening circular recess exits about the chamber. This recess is adapted to receive the foraminous screen 178 which, as explained above, separates the chamber 228 from the Venturi throat 175 and chamber 174.

Having now described in considerable detail the prefoaming means and assemblies, attention can be directed to remaining parts of an apparatus constructed in accordance with the embodiment of FIGURE 9. It will be appreciated by those familiar with the art that the apparatus motor 138 serves to drive a gear means housed within the gear housing 129, and that the gear means in turn serves to drive a pair of rotary brushes such as the brushes 240 and 242 shown in FIGURE 20. The drive arrangement and disposition of the gears is important, but still, the operation thereof and the functions performed thereby can be better understood after consideration has been given to the water pickup arrangement incorporated in the embodiment under consideration.

For water pickup, the forward portion of the apparatus becomes critical rather than the rear portion, just as with the prefoaming operation, the rear portion of the apparatus becomes critical rather than the forward portion thereof. Specifically, the dolly means 210 shown in FIGURE 10 is replaced by another dolly means, such as the dolly means 250 shown in FIGURES 16 and 17. The dolly means 162 is removed from the apparatus, and the forced air stream is merely an ineffective exhaust from the motor housing which permits the necessary motor cooling. The dolly means 250, used for water pickup, as shown in FIGURE 16 includes a hollow coupling tube 254 having a downwardly outwardly flared or tapered rear end 256. The hollow tube 254 leads interiorly of the elongated hollow housing 252.

Supported within such housing is a wiper frame 258 which carries a biasing means in the form of leaf springs 260 (only one of which is shown) for normally urging the upper end of body portion 264 of a wiper 266 in a downward direction. The wiper 266 includes, in addition to body portion 264, a lower wiper blade 268 integrally formed with the upper body portion 264, and a head 270 on the top of the body portion. Head 270 in its downward position seats on interned flanges 272 and 274 of wiper frame 258. Wiper frame 258 is supported by and extends between opposed end walls 251 and 253 of housing 252. Yet, the wiper frame is spaced from the opposed front and rear walls 255 and 257 of housing 252 and from top wall 259 thereof.

The elongated housing 252 is formed with a longitudinally extending bottom opening 253′, and the blade 268 is elongated and disposed to project downwardly, as shown in FIGURE 16, under the biasing action of the biasing springs 260. Still, with such arrangement, the housing is open on opposite sides of and above the wiper means 266 so that air can pass through the inlet opening 253′ and then upwardly into and through the hollow coupling tube 254.

When the wiper dolly 250 is releasably fixed on the apparatus in the position shown in FIGURE 16, then, if a vacuum is applied through the tube 254, as the apparatus is moved across a surface, water and other liquid on such surface would be drawn up through the opening 253′ in the housing 252 and pass outwardly through the coupling tube 254.

Consistent with the invention, means are incorporated on the apparatus for creating the desired vacuum, through the use of the same motor 138. Specifically, as shown in FIGURE 10, the wall means or bottom wall 124 of the base frame means 122 is formed with a recess 280 therein, and disposed within such recess 280 is a centrifugal fan 282. The recess 280 in the bottom wall is normally open on the underside thereof, but a closure plate 284 as shown in FIGURES 10 and 18 closes the recess. However, plate 284 has an aperture 286. This aperture provides an opening leading centrally onto the fan 282 when the components are fixed in position as shown in FIGURE 10. The closure plate 284, moreover, as shown in FIGURE 10, has a passageway defining channel housing 290 fixed to the bottom thereof. This channel housing cooperates with plate 284 to provide a passageway 292 leading to the aperture 286. Passageway 292 has an upwardly outwardly flared forward edge 294 terminating inwardly of the forward edge of bottom wall 124. The forward edge 294 of the cover plate, the forward edge of the channel housing 290, and thus the forward edge of passageway 292, carries a sealing gasket 296 thereon made of some suitable sealing material, such as, for example, rubber. The components are so dimensioned and arranged, as possibly best shown in FIGURE 16, that a continuous passageway is formed from the base opening 253 of the forward dolly means 250 to the fan, the passageway extending through the tube coupling 254, the gasket 296, and the passageway 292.

The centrifugal fan 282, when operated, creates a vacuum causing air to move in the direction of the arrows shown in FIGURE 10, as indicated above. Such movement of the air in cooperation with the atmospheric pressure exerted on water on a given surface causes the water on the surface to rise within the housing 252 and pass through the continuous passageway just described to the fan 282.

Leading outwardly from the periphery of the recess 280 in tangential relation to the fan is an outlet passageway 300. This passageway couples the fan housing formed by the recess 280 and the cover plate 284 with a socket 302, and as explained in more detail below, the container 126 (FIGURE 9) has an inlet mating with this socket so that it receives the air stream passing to and by the fan and having water or other liquid entrapped therein. The container is so constructed as to separate the water from the air stream, and yet retain the water within the container. The construction and operation of the container is set forth more fully hereinafter and suffice it to say at this point that the water pickup is achieved by utilizing a dolly means such as a dolly means 250, a centrifugal fan means as described, and a separating container carried on the apparatus.

Now, again referring to FIGURE 10, it is to be remembered that a dolly means 210 is shown on the apparatus there presented, as opposed to the dolly means 250. Actually, the dolly means 210 and the dolly means 250 are coupled to the apparatus in generally the same manner. The difference resides in the fact that the dolly means 210 is closed except for a forwardly directed opening 330 therein. The dolly means 210 thus does not establish any vacuum on the underside thereof, but instead draws an air stream in from the front of the apparatus. Now, if it is assumed that the apparatus is arranged as shown in FIGURE 10, with the respective dolly means 162 and 210 coupled therewith, then during normal operation, the dolly means 162 serves to provide foam to the periphery of brushes carried on the apparatus. The dolly means 210 on the contrary, having the forwardly directed opening 330 merely provides, in essence, a support for the forward portion of the apparatus, such dolly means having wheel units 210a and 210b thereon for leveling the apparatus in cooperation with the wheel means 206 and 208, to the desired spacing above the floor. Still, the dolly means 210 serves as a flow directing means preventing the vacuum created by the centrifugal fan 282 from being applied to the underside of the apparatus, and instead directing the air flow from the exterior of the apparatus into the apparatus only in a non-harmful manner. Thus, with the arrangement shown in FIGURE 10, the fan means 282 is essentially not utilized, and only the foaming components are effective. In essence, the dolly 210 serves two functions, namely, it is a support and it prevents the vacuum created by the fan 282 from being effective on a surface over which the apparatus is being moved.

When, to the contrary, a water pickup operation is desired, then the foaming equipment is not being utilized and the dolly 210 is replaced by the dolly 250. Moreover, the dolly means 162 is removed and the rear of the apparatus is supported by the permanent rear wheel units 200. With such an arrangement, the forced air stream passing through the opening 156 in the bottom wall 124 is not utilized for any purpose, and instead, the effectively operable component of the apparatus is the dolly means 250 which provides a water pickup action.

The simultaneous operation of the apparatus to provide a forced air stream at the underside of the base frame means, and to provide a vacuum at the underside of the base frame means, permits the selective use of the apparatus for either prefoaming or water pickup. The particular dolly means associated with the apparatus during any given operation are selected so as to cooperate with the apparatus to provide the desired function. Specifically, the dolly means 250 is associated with the apparatus when the vacuum created by the fan 282 is to be used for water pickup. Alternatively, the dolly means 210 and the dolly means 162 are selectively coupled with the apparatus when a prefoaming is to be achieved, and the vacuum is to be directed forwardly rather than to the underside of the apparatus.

Now, for an understanding of the detailed construction of the water pickup arrangement, attention is directed initially to FIGURE 19. From this figure, it will be apparent that the recess 280 in the wall means 124 includes a circular portion 280a and a rearwardly and upwardly extending channel portion 280b. The rearwardly extending channel portion defines part of the passageway 300, the passageway otherwise being closed on its lower bottom by the base plate 284 which covers the rearwardly extending channel portion 280b when the base plate 284 is secured on the bottom wall 124 with the aperture 286 therein overlying the shaft 414 on which the fan 282 is mounted. Channel 280b, however, extends upwardly through the bottom wall 124 and terminates in coupling 280c (FIGURE 11). This coupling mates with a tube 300a (FIGURE 10) to complete the passageway 300 from the fan housing provided by recess 280 to a socket 302 adapted to receive the inlet tube extending from pickup container 126, as discussed more completely below. The tube 300a can be eliminated merely by lengthening coupling 280c or making the rear wall portion of the housing base frame housing 610 lower, and a preferred embodiment contemplates such modification.

In the preceding sections of this specification, considerable attention has been directed to the flanges, passageways, couplings, recesses and the like, on or in the bottom wall or wall means 124. From the description, it should be apparent to those familiar with the art that such wall means can easily be formed as a casting having the various recesses, flange walls and the like formed integrally therewith.

Turning now to the drive for the described fans and brushes, continued reference is made to FIGURE 11. As indicated above, and as best shown in FIGURE 11, the top side of the bottom wall 124 has an upstanding flange wall 127 thereon. The flange wall 127 defines the lower section of the gear housing 129 and to this end, as shown in FIGURE 11, it will be noted that a plurality of gears 400, 401, 402 and 403 are disposed within the confines of the flange wall 127. The gears 400 and 403 are fixed on shafts 406 and 408 which in turn are journaled in conventional manner, in the bottom wall means 124 with the lower ends of the shafts projecting therethrough so as to releasably receive rotatable brushes thereon. In this regard, the shafts 406 and 408 correspond to shafts such as the shaft 18 shown in FIGURE 8. Since the journaling of such shafts in this position, and the general construction of the shafts adapting the same to releasably receive brushes thereon, is conventional, further description thereof appears unnecessary.

Departing from conventional practice, however, the gears 401 and 402 are disposed on shafts 410 and 412 which are carried by the upper section 131 of the gear housing, as shown in phantom in FIGURE 11. In other words, when the components as assembled into their ultimate position, as opposed to being in the exploded position shown in FIGURE 11, the gears 400 and 403 are mounted on shafts 406 and 408 journaled in the bottom wall of the base frame means, whereas the gears 401 and 402 are mounted on shafts 410 and 412 depending from the upper section 130 of the gear housing. The portion of the underside of the bottom wall 124 which underlies the gears 401 and 402 is thus left free of shafts projecting therethrough, and accordingly, the auxiliary fan housing and auxiliary fan 282 can be properly supported in position as described.

Now, again referring to FIGURES 10 and 11, it will be noted that the fan 282 is fixed on a shaft 414 which is journaled in and extends upwardly through the bottom wall 124 and into the gear housing. This shaft 414 has a splined upper end portion which meshes with a drive gear 416 mounted on a shaft 418. Below the gear 416, but on the shaft 418, is a further drive gear 420 which meshes with the peripheral teeth on the gear 402. The arrangement is such that when the gear 416 is driven, the shaft 414 is in turn driven, and the gear 420 mounted on the same shaft 418 as the gear 416 is driven. The gear 420 in turn drives the idler gear 402. By virtue of the meshing peripheral engagement and successive arrangement of the gears 400–403, the respective gears 400–403 are driven.

From the preceding description, as well as by again referring to FIGURE 10, it is to be noted that the lower end of the motor shaft 140 carries a gear portion 422 thereon, which gear portion, in the final assembly, meshes at its periphery with the gear 416. Accordingly, with operation of the apparatus and consequent rotation of the motor shaft 140, the fan 142 mounted on the shaft 140 is driven, and the gear portion 422 is driven. The gear portion 422 drives the gear 416. In turn, the gear 416 drives the shaft 414 and thereby the fan 282. At the same time, gear 420 on shaft 418 is also driven. The gear 420 drives the gear 402, and in turn the gears 403 and 401–400 are driven. Thus, through a single motor, a motor cooling fan 142 is driven, an auxiliary vacuum creating centrifugal fan 282 is driven, and the respective gears 400–403 are driven. With driving of the gears 400 and 403, the shafts 406 and 408 on which such gears are mounted are driven, and thus, when brushes are coupled on the depending ends of such shafts, the brushes are driven. In brief, all of the gears are driven simultaneously, and both the motor cooling fan 142 which provides the forced air draft, and the auxiliary fan 282 which provides the vacuum pickup are driven simultaneously therewith.

If only a normal scrubbing operation is to be performed, brushes would be affixed on the depending shafts 406 and 408. The scrubbing in the usual manner can be carried out with liquid being supplied through the opening 160 in the base of the apparatus. The forced air stream and the vacuum existent on the underside of the apparatus are ineffective. Alternatively, wax may be supplied through the opening 160 from a suitable container as would be the case with conventional apparatus. When, however, it is desired to perform a foam scrubbing operation, then the dolly 162 would be secured in position as described on the rear portion of the base frame means, and the dolly 210 would be positioned on the forward portion of the base frame means. Foamable liquid would be supplied selectively through the outlet or opening 160. The foam would then be delivered to the periphery of the brushes with the vacuum being ineffective due to the forward opening in the dolly 210.

When a water pickup operation is desired, the dolly 162 would be removed, the dolly 210 would be removed, and the dolly 250 would be placed on the apparatus. The rear wheels 209 fixed on the apparatus would support the rear portion of the apparatus, with the wheel units 251 on the dolly 250 supporting the forward portion of the apparatus. At this time, the forced air stream would still issue through the opening 156, but it would be harmless. At the same time, the vacuum would be applied on opposite sides of the wiper 268 so that water could effectively be picked up from the surface being traversed.

It is thus possible with an apparatus constructed in accordance herewith to achieve normal polishing operations, normal scrubbing operations, water pickup operations, and prefoaming operations. The particular operation desired merely requires an easy selection and placement or removal, as the case may be, of the proper attachment or dolly means to perform the operation, and of course, the proper supply of the desired fluid through the apparatus, and for water pickup, provision of a container for storing liquid pickup by the apparatus for subsequent disposal.

The particular means utilized for releasably coupling the respective dolly 210 and 250 on the base frame means, or specifically the underside of the bottom wall 124 can be varied. However, preferably, each of the dolly means as shown in FIGURES 17 and 18, carries a pair of flange supports (331a–331b and 250a–250b) which in turn carry a pair of locking screws thereon such as the locking screws 480–482 (FIGURES 12 and 15). The screws respectively cooperate with threaded apertures 484–486 (FIGURE 19) provided in the bottom wall for releasably coupling the dollies in the desired location.

Aside from the above, if desired, a squeegee can be releasably secured to the apparatus. Such squeegee can take the form, for example, of the squeegee 490 shown in FIGURE 20. This squeegee comprises a spongelike bottom pad carried on a support 492. Support 492 has a suitable upstanding flange (not shown) whereby the same can be easily received within the flange wall 186 depending from the bottom wall 124. Alternatively, when the squeegee is inverted, it will seat within such flange wall 186, if desired.

The brushes used on the apparatus can be of any conventional type. However, they preferably are centrally recessed and provided with pivotally mounted clip members 496 and 498 (FIGURE 20) which clip members are engageable with the depending portions of the shafts 406 and 408 to releasably fix the brushes on, and for rotation with, the shafts. For positive drive of the brushes with the shafts, the brushes, as shown in FIGURE 20, have hexagonal openings centrally thereof, and the upper portion of the depending part of the shafts 406 and 408 are of corresponding hexagonal contour and sufficient size to non-rotatably accommodate the hexagonal openings, thereby positively fixing the brushes for rotation with the respective shafts.

Having now described the base section and associated components of the apparatus in considerable detail, attention can be directed to the handle assembly 123, and to the respective containers provided for housing fluid either picked up by the apparatus, or to be supplied to the base of the apparatus.

As best shown in FIGURE 21, the handle assembly 123 includes a handle frame 500 having a bifurcated lower section 502. The section 502 includes a platform 504 and a pair of arms 506 and 508 extending downwardly from opposite sides thereof, only the arm 506 being shown in FIGURE 21. The platform 504 has a well 510 therein (FIGURE 22), the sides of which well are defined by an upstanding peripheral wall 512 surrounding the well. The well 510 further has a socket 514 therein which socket, as shown again in FIGURE 21, leads to a coupling conduit 528 entering the base of the socket 514. A preferred construction of the socket 514 is presented in FIGURE 23. By reference to this figure, it will be noted that the bottom wall of the well 510 has an opening 520 therein. Received in the opening 520 is a sealing grommet 522. Coupled to the underside of the bottom wall of the well is a coupling housing 524 having an outlet connection 526 connected to the conduit 528. Conduit 528 leads interiorly of the leg 506, as indicated by the dotted line in FIGURE 21, to the base frame means, the leg 506 itself being a hollow member so as to receive the conduit 528 therethrough.

The well 510 is dimensioned to receive the bottom end portion of storage container 128. Such container, as shown in FIGURE 24, has an outlet valve means 532 therein. The valve means 532 preferably is constructed as shown in FIGURE 25. Specifically, the container is provided with a bottom cap 534 that screws onto threaded spout 536 on the container 128, the cap 534 having an outlet spout 554. Disposed within the cap 534 and, as shown, in closing relation to outlet spout 554 thereof, is a semi-spherical valve head 538 normally biased downwardly by a spring 542 adjacent the spout 536 of the container. Leading from the valve head 538 is an activating arm cord or wire 546. This wire extends through the container at the upper end thereof and into a recess 550 in the rear of the container (FIGURE 26). The wire 546 carries at its upper end a head 552 which can be lifted to in turn lift the valve head 538 thereby opening the spout 554 in the cap 534.

When the container 128 is supported on the platform section 504 of the handle assembly, then the outlet spout 554 mates with the socket 514 so that when the valve head 538 is lifted from the position shown in FIGURE 25, fluid within the container will drain therefrom under gravitational force, into and through the socket 514 thereby being fed in turn through the conduit 526.

To operate the valve head 538, a trigger assembly is provided in the handle grip 130 as explained more fully below. Suffice it to say at this point that the container 128 is incorporated as a fluid storage container, and that the same has an outlet valve means controllable by a valve actuating head 552 exposed at the rear top of the container. It will be appreciated by those familiar with the art that container 128 can be used to store wax, regular cleaning solution, foamable cleaning solution, etc., and that such container can be regarded as representative of one of several containers, each of which has a different fluid therein.

Regardless of the contents, container 128 is carried on handle assembly 123, and the handle assembly 123 is, as also indicated above, pivotally mounted on the base frame means 122. To this end, as shown in FIGURE 27, base frame means bottom wall 124 has a pair of upstanding brackets 600 and 602 which project from the top side thereof. These brackets receive respective pivot shafts 604 and 606 that extend inwardly from the respective depending arms 506 and 508 of the handle assembly through the side walls of a base housing 610 which covers the motor and gear housings. The arms 506 and 508 of the handle assembly thus extend downwardly on opposite sides of the housing 610 which covers the upper side of the bottom wall 124 and surrounds the gear housing as well as the motor housing. The particular pivotal connection between the handle frame assembly and the base frame means is not critical, but it is important to note that the conduit 528 preferably leads through the hollow arms at the lower end of the handle assembly and then into the housing through a suitable opening (not shown) so as to not be exteriorly exposed in operation of the apparatus. It is further important to note that the pivotal connection and the disposition of the platform section 502 of the handle assembly should be such that the handle assembly is swingable from the position shown in FIGURE 9 to the position shown in FIGURE 21.

The significance of mounting the platform section 502 of the handle assembly 123 intermediate the ends thereof and toward the bottom of the handle assembly is that such mounting permits the handle assembly to be swingable over the container 126 which is incorporated to receive the fluid picked up from a floor, thus minimizing the bulk of the apparatus. With the stacked arrangement of containers, the respective containers are so arranged that the container 126 is disposed nearest the base frame means whereby the energy required to deliver an air stream with entrapped fluid therein is minimized.

Continuing with the description of the handle assembly, a slidable cover member 611 is incorporated thereon thus when the container 128 is supported with its base in engagement with the bottom wall of the well 510, and with its outlet valve means 532 associated properly with the socket 514, the cover member 611 can be moved downwardly over the top end of the container 128 to essentially releasably lock it in position on the handle assembly. A slide mounting plate 612 forming part of the handle frame slidably receives the cover member 611 thereon. Any slidably engageable components can be provided for this purpose, and since slide covers of this type have previously been marketed, further description of the details of construction and operation in this regard appears unnecessary. However, it is important to note that a hollow handle shaft 614 (FIGURES 9 and 22) extends upwardly from the relatively fixed slide mounting plate 612, the shaft 614 terminating in the handle grip 130. Extending through the hollow handle shaft 614 is the electrical cord for the motor, and a control wire 618 for controlling valve operating fork member 616 disposed forward of the relatively fixed member 612 and within the cover member 611 (FIGURE 22). The fork member 616 is engageable under the head 552 on the actuating wire 546 of the valve means 532 of the container 128. The actuating member 616 is coupled via the wire 618 leading through the hollow shaft 614 with the handle grip 130, or specifically, a trigger mechanism 620 therein. As shown in FIGURE 28, trigger mechanism 620 includes a slide plate 622 having a coupling stud 624 projecting therefrom and connected with the wire 618. The slide plate 622 carries a depending trigger finger 626 exposed exteriorly below the handle grip for engagement by a finger of the user.

When the trigger 626 is moved to the right as shown in FIGURE 28 or rearwardly in the use of an ultimate apparatus, the wire 618 is pulled upwardly, thereby moving the actuating member 616 upwardly. Since this actuating member, in operation, is engaged under the head 552 of the valve actuating mechanism, the head 552 is moved upwardly, thereby opening the outlet valve means 532 through lifting of the valve head 538 (FIGURE 25). In other words, the trigger assembly permits control of the delivery of fluid from the container 128 to the base of the apparatus.. With the conduit 526 leading from the socket in the platform section 504 of the handle assembly, coupled to the coupling tube 158 (FIGURE 10), fluid is supplied from the container to the coupling tube 158 and in turn through the opening 160 in the base frame means.

The handle grip assembly 130 is preferably formed of two sections, namely, a base section 640 and a cover section 642. The base section 640 has an opening 644 therein through which the trigger 626 projects. Moreover, the base section 640 is provided with a slideway including a pair of reversed and inturned L-shaped flanges cooperating with a slide plate 622. One of such flanges 646 is shown in FIGURE 28 as having its upper leg projecting inwardly over one side of the slide plate 622 to slidably mount the same. The other L-shaped flange is similarly disposed, but on the opposite side of slide plate 622.

The base section of the handle grip assembly further includes a pair of upstanding coupling posts 646 and 648 which cooperate with a pair of depending posts 650 and 652 extending downwardly from the cover section 642 of the handle grip. All of such posts are centrally hollow, but the posts 650 and 652 are threaded to receive the threaded end portions of screws 654 and 656 which extend freely through the posts 646 and 648 then threadably into the posts 650 and 652, to secure cover section 642 on base section 640.

It will be noted from FIGURE 28 that the base section 640 includes upstanding side walls 660 (only one of which is shown). In essence, the base section is a hollow channeled member downwardly offset in the rear portion and having a rearwardly and outwardly directed opening 662 in the base thereof. The cover member 642, on the other hand, is essentially a flat plate member contoured to seat on the base section 640 and between the forward upper side extremities 660a of the side walls 660.

It will be appreciated that while only one side wall 660 and upper extremity 660a is shown in FIGURE 28, the construction is virtually identical on the opposite side of the handle grip assembly and that the cover section closes the base section to yield the final closed handle grip.

For purposes of controlling the motor of the apparatus, the handle grip assembly further includes a switching means generally designated by the numeral 700. This switching means, in turn, includes a switch housing 702 having a control button 703 projecting upwardly therefrom and extending through an opening 705 in the cover section 642 of the handle grip assembly.

The switch housing 702 includes first and second housing sections 704 and 706 which sections mate along an axis or plane extending parallel to the top and bottom walls 708 and 710 respectively of the housing. Each of the housing sections is recessed in opposed end walls thereof, and each housing section carries a collar element projecting outwardly of each recess therein. Specifically, it will be noted that the housing section 704 is recessed in the side walls thereof as at 711 and 712 and similarly, the housing section 706 is recessed as at 711a and 712a. Each recess is square or rectangular in shape, and adjacent each recess, each section is provided with an integrally formed square or rectangular outwardly projecting collar element 710b–710c and 712b–712c. The collar elements carried by the first and second switch housing sections cooperate to form respectively opposed square or rectangular cable collars 720 and 724 leading to the interior of the switch housing 702. The collars, as shown in FIGURES 28, are dimensioned to tightly peripherally engage a cable received therein. To this end, not only are the openings in the collars dimensioned for the engagement, but in addition, each of the collars have a retaining member 728–730 frictionally surroundingly received thereon. This retaining member can be in the form of a ring member or a cap member having an opening therein for accepting the cables. The cap members serve to insure positive engagement of the collars with the periphery of a cable extending therethrough. The engagement exists over the length of the collars thus effectively sealing the cables within the collars.

As seen in FIGURES 28 and 29, the collar elements 710b–710c and 712b–712c are additionally provided with a series of transversely extending ridges 713–715 for engaging the periphery of the cable extending therethrough. Thus, any force exerted on the cables in a direction away from the switch housing 702 will tend to bind the cables on the ridges and hold the cables within the switch housing 702.

Additionally, the caps serve to maintain the housing sections 704 and 706 in engagement. Yet, additional means are provided for further securing the housing sections in mating engagement and in fixed disposition on the handle grip cover section 642. Specifically, it will be noted that the section 704 is provided with lateral bosses 750 and 752. The section 704 is provided with recesses 751–753 in the side walls thereof and the respective bosses 750–752 are each aligned with the recesses 751 and 753 respectively (FIGURE 29). The bosses are interiorly hollow so as to receive therethrough a fastening screw (not shown) for securing the switch housing to the handle grip cover section 642.

For purposes of maintaining the switch housing sections 704 and 706 in an aligned and secure position, the housing section 704 is provided with a pair of horizontally spaced apart upstanding projections 759, 761, as shown in FIGURES 29 and 43. These projections are integrally formed with the side walls of the housing section 704 and spaced inwardly thereof. In this manner, the interior surface of the side walls of the housing section 706 are engaged by the projections 759 and 761 to prevent lateral movement of the housing sections with respect to one another.

As seen in FIGURE 43, the housing section 704 is also provided with a projection 763 on the collar element 710c for engaging the recess 765 (FIGURE 42) on the collar element 710b of the housing section 706. In this manner, longitudinal movement of the housing sections 704 and 706 with respect to one another is prevented.

With the described construction of the switch housing, the switch operating mechanism which can take any suitable form, is first mounted in any desired known manner within the switch housing section 706. The cables are either already connected therewith or then connected therewith. Thereafter, switch housing section 704 is placed in mating engagement with section 706 and the respective caps 728 and 730 are slipped over the respective collars 720 and 724 and tightly frictionally engaged thereon. This results in tightly engaging the periphery of the cables with the interior of the collars and maintaining the respective switch housing sections in engagement. Thereafter, the switch assembly, as then fabricated, is mounted on the trigger assembly cover section 642 by passing the screws through aligned bosses and into then aligned threaded apertures (not shown) on the cover section 642.

By virtue of the aperture, recess and boss arrangement provided hereby, there is a proper alignment of the switch housing within the trigger assembly, and fabrication operations are simplified and reduced to a minimum. Still, sealing of the cables within the collars is achieved.

The switch housing, as shown, is preferably rectangular in shape, and each collar element provided thereon is preferably square or rectangular in shape. It will be understood, however, that the shapes can vary with the shape of cable used and the design of the handle assembly. Still, the housing sections, as noted, have bosses cooperating with aligned apertures provided on the mounting plate therefor so as to incorporate means for positively securing the sections together—i.e., screws passing through the bosses and recesses and into the apertures as indicated.

When a handle grip assembly as described is mounted at the upper end of the handle assembly, the motor is controlled through operation of the switch, and the delivery of stored fluid from the container 530 is controlled through operation of the trigger assembly. The operator can, with a single hand, adjust both controls so as to efficiently operate the apparatus. The particular wiring utilized between the switch and motor in the apparatus is conventional, and detailed discussion thereof is accordingly not presented.

To the contrary, the electrical characteristics of the motor housing preferably utilized in an apparatus constructed in accordance herewith are important, and in this regard, attention is now directed to FIGURES 30 and 31. These figures present the motor fan assembly described, for example, in connection with FIGURE 2 or FIGURE 10, but different numerals have been used to facilitate description. This motor fan assembly, as shown in FIGURES 30 and 31, has a housing 800 with air outlet openings 801 at the lower portion thereof. Moreover, the housing has an upper edge portion such as the edge portion 802 which is spaced from and above the openings 801. A motor 806 is mounted in the housing, and has an output shaft 810 depending therefrom. The fan element in this instance designated by the numeral 812, is disposed in the housing and mounted on the output shaft 810 for drawing air downwardly through the housing and forcing the same outwardly through the air outlet means which, as indicated, take the form of opening 801.

From FIGURE 30, it will be noted that the upper edge portion 802 of the housing 800 is peripherally recessed as at 814. Moreover, it will be noted that a cover 816 is provided for the housing, which cover has a top wall 818 and a depending skirt wall 820. The skirt wall carries a plurality of projections 822 thereon (FIGURE 31) and moreover, is recessed about its periphery at a plurality of locations, e.g., as at 824. The projections 822 serve to maintain the depending skirt wall 820 in spaced relation to the underlying outer periphery of the upstanding wall portion of the recess 814 on the housing upper edge portion 802. With such an arrangement, and when the cover member is seated on the upper edge portion as shown, there are a plurality of air inlet passageways to the motor housing, but each of the passageways as shown by the arrows on the right upper side of FIGURE 30 extends vertically upward during at least a portion thereof in the path of movement of air from outside of the housing to inside of the housing.

It is important to note that the skirt wall or portion 820 of the cover 816 peripherally surrounds the upstanding portion of recess 814, and that the peripheral edge portion of the housing terminates throughout its periphery above the upper edge of any of the recesses in the skirt portion, such as the recess 824. With the outward spacing of the skirt wall 820 with respect to the upstanding portion of the recess 814, and with the provision of the recesses and projections as described, air must travel into the housing only through one of the recesses in the skirt wall and in an upward vertical path and then between the upper edge of the housing and the underside of the cover top wall 818 into the housing. Accordingly, if water or other liquid is spilled near or adjacent the motor housing, the same will not enter the housing. Specifically, to have liquid flow into the housing, it is necessary to virtually turn the housing upside down and cause the liquid to flow therein. The housing thus provides effective insulation against any short circuiting and accordingly, works in cooperation with the switching means described above to insure troublefree electrical operation.

To secure the cover 816 of the motor housing in position, the cover is provided with apertures 854 therein, such apertures being positioned to overlie aligned threaded apertures or bores 850 and 852 provided in the housing 800 and opening on the horizontal wall of the recess 814. Screws 856 extend through the apertures in the cover, and threadably engage the apertures in the housing 800 to secure the cover 816 in position. Preferably, the cover 816 is recessed about the apertures or bores therein to receive the heads of the screws. While only one screw 856 is shown in FIGURE 30, it will be appreciated that the other screw provided cooperates with the threaded aperture 852 in the same manner that shown screw 856 cooperates with threaded aperture 850.

A motor fan assembly and housing as described immediately above would ultimately have an external appearance corresponding to the external appearance of the motor housing 30 of FIGURE 2. The air inlets 36 of FIGURE 2 correspond to the passageways provided by the cooperating projection and recess arrangement shown in FIGURES 30 and 31. The bottom of the housing 800 is, as conventional, closed generally, but constructed to receive the motor shaft 810 therethrough as shown in FIGURE 30.

Even though FIGURES 30 and 31 present the details of a motor housing such as shown in side elevation in FIGURE 2, it should be apparent that the housing cover arrangement and the passageway arrangement described in the immediately preceding paragraphs is also utilized in the motor housing sections 134–136 of FIGURE 10.

Just as the switch assembly described previously above, in and of itself constitutes an important feature of the invention, the motor fan assembly and inlet means thereof also constitutes an important feature of the invention. Similarly, the pickup container provided hereby has individual significance. The pickup container or receptacle 126, as indicated above, serves to store water or other liquid which has been picked up by the apparatus of FIGURE 9 when the same is operated with the dolly 250 removably secured thereon. In other words, the container or receptacle 126 permits collection of dirty fluid until it can be disposed of conveniently.

In further explanation of such receptacle, reference is made to FIGURES 32–41. As shown in these figures, the receptacle 126 is of substantially rectangular horizontal section and has an upwardly recessed bottom wall 928 (FIGURES 37 and 38) and upwardly convex recesses 930—930 at opposite sides for straddling a motor housing 610, shown in FIGURE 10, and the pivot connections for the handle assembly lower arms 508 and 506. The receptacle is designed to fit against the upper side of such housing 610 in such fashion that its walls blend with the walls of such housing. The container 126 is secured in position by a bail 932 having a loop 934 which crosses the top of the receptacle 126 and is seated in a recess 936 thereon. The bail 932 further has end arms or limbs 938—938 which extend downwardly along the sides of the receptacle 126 and which are pivotally secured at their lower ends to the bosses 924—924 which project outwardly of housing 610, such bosses constituting part of brackets 600 and 602 (FIGURE 27) which further pivotally mount arms 506–8. By swinging the bail from its upright position, as shown in FIGURE 41, to the position shown in FIGURE 33, the receptacle 126 may be released and removed for the purpose of emptying it of dirty cleaning fluid.

Figure 33:
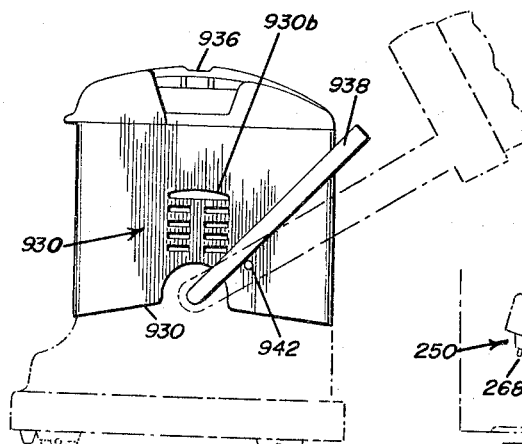
FIGURE 33 is a side elevational view showing the apparatus of FIGURE 32 with the handle assembly lowered and with a locking means associated therewith moved to an inoperative position to permit the removal of the lower receptacle from the apparatus.

As indicated above, the handle assembly 123 which is provided for moving the apparatus around the floor has its lower end arms 508 and 506 pivotally mounted at their lower ends on the same bosses as those which mount the lower ends of the limbs 938–938 of the bail 32, so that the handle has pivotal movement about the same axis as that of the bail. For the purpose of reengaging the bail with the receptacle without having to manually push it into place, pins 942—942 (FIGURES 33 and 34) are secured to the legs 504. These pins or stubs project inwardly and extend across the rear edges of the limbs 938—938 of the bail. By moving the handle assembly 123 from an angularly disposed position, as shown in FIGURE 33, to a substantially upright position, the pins 942—942 force the bail into an upright position so that the loop 934 thereof snaps into the recess 936 on top of container 126. Since the receptable 126 surrounds the housing 610 preferably, the wall portions 930a thereof have louvers 930b therein for ventilation of the motor—i.e. connecting the inlets of the motor housing with the external atmosphere.

In the use of the apparatus, it may be difficult in certain instances, to pick up puddles of liquid close to the wall while moving the apparatus in a forward direction since even though most of the liquid is picked up while moving forward, moving the machine toward the wall with a wiper dolly attached, for example, tends to push a very small quantity of the fluid into the corner. To remedy this, as herein illustrated (FIGURE 34), the apparatus is tilted up about its rear edge so as to raise the wiper 268 from the floor, whereupon the apparatus is moved forwardly to the wall so as to bring the wiper down behind the puddle, indicated at W (FIGURE 34), and, by drawing the apparatus rearwardly, sweeping the puddle away from the corner where it may easily be picked up. To effect such tilting of the apparatus about its rear edge, the lower ends of the limbs 938—938 of the bail are provided with projections 944—944, as shown in FIGURE 35, and the lower ends of the legs 506–508 are provided with lugs 946—946, both the projection and lugs being located below the axis of rotation of the bail and handle. When the handle is moved in a clockwise direction through approximately 45°, the lugs 946—946 engage the projections 944—944 so that further movement of the handle, of necessity, tilts the apparatus about the axis of the wheels 209 at the rear of the apparatus.

Figure 36:
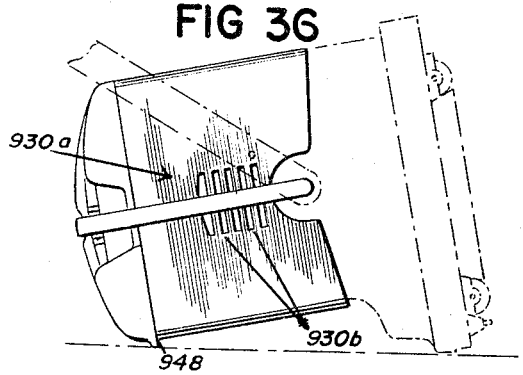

As has been previously mentioned, this apparatus is designed not only for scrubbing operations, but it also can be used to remove the dirty fluid following a scrubbing operation by employing dolly 250. When the latter operation is being performed, the scrubbing brushes are removed. This is accomplished by tipping the apparatus over onto one side, as shown in FIGURE 36—a projection 948 being provided on the receptacle 126 adjacent the top for stably supporting the apparatus in this position. The brushes may then easily be removed. Because of the rather extreme tilting of the receptacle when the apparatus is in this position, the receptacle is specially constructed in accordance herewith to prevent spilling of any fluid that may already be in it. To this end, as shown in FIGURES 37 to 39 inclusive, the receptacle, which is of substantially rectangular cross-section, has upper and lower chambers 950 and 952 separated by a transverse wall 954. An input tube 956 extends upwardly through the bottom and the lower chamber 952 into the upper chamber 950. The lower end of the tube 956 is adapted to seat in the sealing coupling socket 302 which is coupled with the pickup fan pump 282 as shown in FIGURE 10.

Figure 34:
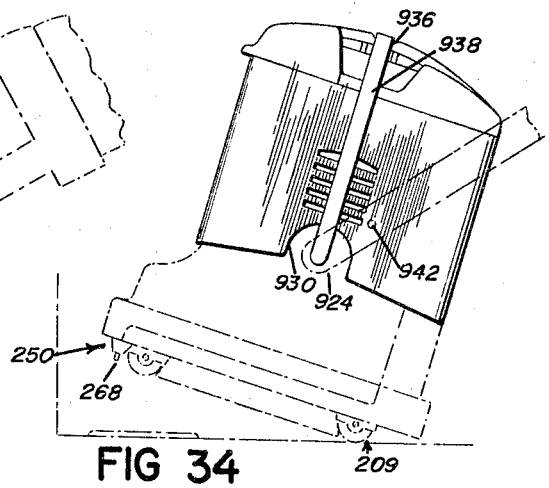
FIGURE 34 is a side elevational view of the apparatus of FIGURE 32, as tilted at its rear end edge.
Figure 35:
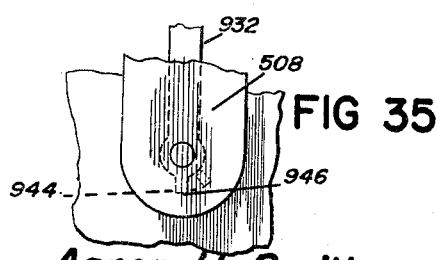
FIGURE 35 is a fragmentary detailed view of the means associated with the apparatus of FIGURE 32 to readily permit tilting the apparatus as shown in FIGURE 34.

In FIGURE 34, the dot-and-dash line c represents diagrammatically the passage of the fluid from the pickup dolly 250 through the pump 282 to the coupling socket 302. Referring again to receptacle 126, and particularly FIGURES 37-40, it will be noted that in the upper chamber 950, spaced baffles 962—962 are incorporated. These baffles extend from the end of the upper chamber adjacent the upper end of the tube 956 in diverging relation to each other toward the opposite end of the chamber 950, terminating short of this end. The baffles are spaced from the side walls so that they divide the upper chamber into a central passage 964 and two outside passages 966—966 (FIGURE 39). At the ends of the outside passages 966—966, adjacent the upper end of the tube 956 in the top, there are spaced parallel openings 968 bounded by vertically disposed, spaced inwardly extending parallel fins 970. In the wall 954, adjacent the divergent ends of the baffles and situated between these ends and the outer walls, there are slots 972—972 which open from the upper chamber into the lower chamber. As thus constructed, when a mixture of air and water is forced upwardly through the tube 956 into the upper chamber 950, it first enters the center passage 964, moves from right to left, as shown in FIGURE 39 by the arrows, because of the diverging relation of the baffles, and slows down sufficiently so that the water and air separate—the water draining through the openings 972—972 into the lower chamber and the air continuing along through the outer passages 966—966 and upwardly through the outlet openings 968.

By locating the tube 956 and the openings 968 at the back side, it is readily apparent that when the receptacle is tipped forwardly, as shown in FIGURE 38, these are located at the top and the major volume of the receptacle is situated below these openings so that substantially a full receptacle can be tipped over without loss or spilling of fluid.

This embodiment of the apparatus as thus described embodies as its primary features a compactly designed scrubbing machine and storage receptacle for dirty fluid; locking means for holding the receptacle in place which can be moved into locking position merely by angular movement of the handle with which the apparatus is pushed about; locking means associated with the handle whereby the apparatus may be tilted up about its rear edge to enable presenting the squeegee at its forward edge close to the wall; and a receptacle which is both efficient in separating the dirty fluid from the intake air provided for suction and will permit tipping the receptacle over onto one side for the removal of brushes without spilling of the fluid.

Aside from the specific structural aspects of the pickup container and locking means associated therewith, it should be apparent from the preceding description of the container that the same is readily adapted for use in the embodiment of FIGURE 9 hereof—i.e., it is readily adapted to receive dirty fluid delivered thereto as entrained in an air stream leading from the centrifugal fan or pump 282. The container is thus not only important individually, but it has cooperative significance with respect to the overall combination.

Although the construction arrangement and disposition of various elements, including the pickup container, have been discussed above, no mention has been made as to the material which can be utilized in the formation of such components. In this regard, it should be noted that various elements and components can easily be constructed from suitable available plastics such as polyethylene, polystyrene, polypropylene or the like. In fact, the flow directing means, the storage and pickup container, the various dolly means, and the flexible conduit means utilized are preferably formed from such plastics. On the other hand, the frame components are preferably formed as metal castings or from sheet metal as required or desired.

Having now described illustrative and preferred embodiments of the present invention in sufficient detail to permit a complete understanding of the various aspects of the invention, it should be apparent to those reading this specification that the objects set forth at the outset hereof have been successfully achieved. Accordingly, what is claimed is:

1. Floor conditioning apparatus comprising:
  (a) frame means adapted to receive floor-engaging attachments thereon;
  (b) a motor mounted on said frame means;
  (c) passageway means, including a delivery portion;
  (d) fan means driven by said motor for drawing air through said passageway means across said motor, and forcing said air through said delivery portion; and
  (e) dolly means removably attached to said frame means in at least partially underlying relation thereto, said dolly means including a foaming chamber means disposed to receive air forced by said fan means through said delivery portion, said foaming chamber means including means for mixing said air with liquid to produce foam.

2. Floor conditioning apparatus as defined in claim 1 wherein said motor and said fan means are mounted in a housing having at least one air outlet, and wherein said passageway means includes said housing and a channel leading from said air outlet, said channel providing said delivery portion.

3. Floor conditioning apparatus as defined in claim 2 wherein said frame means includes wall means, wherein said motor includes a depending shaft, wherein said fan means comprises a fan member mounted on said shaft, wherein said housing has a lower outlet adjacent said fan and an upper inlet spaced thereabove, and wherein said apparatus further includes:
  (a) a pair of brush drive shafts journaled in and depending from said wall means;
  (b) gear means disposed above said wall means and cooperating with said drive shaft;
  (c) drive connecting means coupling said gear means with said motor shaft for driving said gear means therefrom; and,
  (d) a gear housing for said gear means supported on said wall means, said gear housing being disposed below said motor housing with said depending shaft projecting through said motor housing and into said gear housing;
said delivery portion of said passageway means further including an opening in said wall means comprising part of said channel.

4. Floor conditioning apparatus as defined in claim 3 wherein said gear means comprises four aligned and successively meshing gears, the outer two of said gears being drivingly carried on said brush drive shafts, the inner two of said gears being journaled on shafts depending from an upper wall portion of said gear housing, one of said inner two gears being drivingly connected to said depending motor shaft.

5. Floor conditioning apparatus as defined in claim 4 and further including:
  (a) handle frame means;
  (b) means pivotally coupling said handle frame means with respect to said first mentioned frame means;
  (c) container means carried by said handle frame means, said container means having an outlet thereon, a valve normally closing said outlet, and a reciprocal actuating member for operating said valve;

(d) a trigger assembly at the upper end of said handle frame means, said trigger assembly including a reciprocally movable trigger member;

(e) connecting means disposed within said handle frame means and connecting said trigger member with said actuating member whereby reciprocal movement of said trigger member causes selective operation of said valve;

(f) said handle frame means including a platform intermediate the ends thereof for supporting said container, said platform having a socket therein for receiving said outlet on said container; and (g) conduit means extending below said platform and then within said handle frame means to deliver liquid for mixture with said air.

6. Floor treating apparatus as defined in claim 3 wherein said dolly carries a funnel member thereon having an upper edge portion engaging said wall means in surrounding relation to said opening, said foaming chamber means being disposed to communicate with said funnel member, said foaming chamber means having a foraminous partition therein disposed across the path of fluid traveling therethrough, and wherein said apparatus further includes a pair of brushes carried on said brush shafts, said foaming chamber means having a pair of outlet conduits leading therefrom to the periphery of said brushes.

7. Floor conditioning apparatus as defined in claim 3 wherein said wall means has depending coupling posts thereon, and wherein said dolly means has sockets therein for frictionally receiving said posts to position and couple said dolly on said wall means.

8. Floor treating apparatus as defined in claim 1 wherein said foaming chamber means has a foraminous partition therein, wall means dividing said foaming chamber means into separate compartments below said foraminous partition, and outlet conduits individually communicating with respective of said compartments.

9. Floor treating apparatus as defined in claim 2 wherein said dolly means comprises a dolly element having floor-engaging wheels thereon for at least partially supporting said apparatus on a floor.

10. Floor treating apparatus as defined in claim 9 wherein said apparatus includes floor-engaging brush means and means for driving said brush means with said motor, and wherein said dolly element has a pair of forwardly disposed floor-engaging wheels and a pair of rearwardly disposed floor-engaging wheels, depending wall means adapted to perpherally partially surround said brush means, and conduit means extending by said depending wall means for delivering a fluid mixture from said foaming chamber means to the periphery of said brush means above the floor-engaging peripheral portion of said brush means.

11. Floor treating apparatus as defined in claim 9 wherein said dolly element comprises an elongated housing removably secured to the bottom of said frame means, wherein said wheels are carried on opposite end portions of said elongated housing, and wherein said foaming chamber means includes a foaming chamber and funnel means leading from said delivery portion of said passageway means to said foaming chamber.

12. Floor treating apparatus as defined in claim 1 wherein said passageway means is formed to direct air downwardly past said motor, then laterally thereof and then downwardly through said delivery portion below said frame means.

13. Floor treating apparatus as defined in claim 1 wherein said dolly means consists essentially of a base, a hollow cavity thereon forming said foaming chamber means, screen means in said cavity for mixing air with liquid, an inlet means to said cavity for receiving said air forced through said delivery portion and liquid, and outlet means from said cavity for delivering foam therefrom.

14. Floor conditioning apparatus adapted to be used with dolly means of the type capable of receiving air and liquid and mixing the same to provide foam, said apparatus comprising:

(a) frame means having a given opening means thereon;

(b) a motor carried on said frame means;

(c) fan means driven by said motor for drawing air;

(d) passageway means for directing said air drawn by said fan means across said motor and to said given opening means;

(e) means for directing liquid to said given opening means;

(f) said given opening means being disposed to deliver substantially nonfoamed liquid therethrough to an under-lying floor when a dolly is not disposed thereunder; and, (g) positioning means adapted to locate a dolly means under said frame to receive both air and liquid from said given opening means.

15. Floor conditioning apparatus as defined in claim 14 wherein said frame means includes a bottom wall having an under-surface normally facing a floor in use of said apparatus, said bottom wall having said opening means therein; wherein passageway means for directing said air includes condit means leading from said fan means to said opening means; wherein said apparatus includes fluid supply means carried by said apparatus and conduit means leading from said fluid supply means to said opening means.

16. Floor conditioning apparatus as defined in claim 14 wherein said motor comprises an electric motor having an output shaft, said fan means comprises a fan blade element mounted on said output shaft, and said motor and said fan element are mounted in a common housing.

17. Floor conditioning apparatus as defined in claim 16 wherein said output shaft is vertically disposed; wherein said apparatus includes floor-engaging brush means comprising a pair of rotary brushes and means for mounting said brushes for rotation about a vertical axis; wherein said motor means further includes gear means for driving said brushes from said motor output shaft; and wherein said passageway means includes conduit means leading from said common housing to said given opening means.

18. Floor conditioning apparatus as defined in claim 17 wherein said conduit means includes a receiving chamber adjacent said opening means, said receiving chamber receiving said air directed to said given opening means and being adapted to receive liquid therein, said given opening means comprising an opening in said frame means for passing air and liquid therethrough from said receiving chamber.

19. Floor conditioning apparatus as defined in claim 17 wherein said opening means comprises a pair of openings and said conduit means communicates with one of said openings, and wherein said apparatus further includes a fluid supply and means communicating said fluid supply with the other of said openings.

20. In a floor cleaning apparatus of the type including a base frame means with a bottom wall disposed to normally face a floor in use of the apparatus, rotary floor engaging brushes mounted below said bottom wall for rotation about vertical axes, and means for driving said brushes including an electric motor, the improvement comprising:

(a) fan means driven by said motor for creating an output air stream;

(b) means for directing said air stream through said bottom wall, such means including an opening in said bottom wall and conduit means leading thereto from said fan means;

(c) liquid storage means carried on said apparatus and having a liquid outlet therein;

(d) means for directing liquid from said outlet through said bottom wall, such means including an opening in said bottom wall and conduit means leading thereto from said storage means;

(e) dolly means mounted on said bottom wall, said dolly means having a chamber therein, means for engaging said bottom wall about the opening therein communicating with each of said conduit means for directing air and fluid into said chamber, a foraminous partition in said chamber in the path of fluid passing therethrough, and outlet passageway means leading from said chamber to the periphery of said rotary floor engaging brushes.

21. The improvement defined in claim 20 wherein said bottom wall and said dolly means carry cooperating attaching means for removably mounting said dolly means on said bottom wall.

22. The improvement defined in claim 21 wherein said attaching means comprises post elements projecting from said bottom wall and sockets in said dolly means for receiving said post elements.

23. The improvement defined in claim 22 wherein said dolly means includes depending walls disposed partially about the side periphery of said rotary floor engaging brushes.

24. The improvement defined in claim 20 wherein said means for directing said air stream through said bottom wall and said means for directing liquid through said bottom wall include a common chamber in said base frame means, said chamber having an outlet passageway leading through said bottom wall, said chamber having a pair of input couplings for selectively receiving conduit means leading from said liquid storage means.

25. A dolly adapted to be secured to the bottom wall of a floor cleaning apparatus having rotary brushes for supplying a foamed mixture to the periphery of said brushes, said dolly comprising frame means, a chamber in said frame means, a foraminous partition in said chamber in the path of fluid travel therethrough, outlet conduit means leading from said chamber and adapted to deliver foam to the side periphery of the brushes, wheel means on said frame means and positioning means on said dolly adapted to cooperate with the apparatus whereby said dolly at least partially supports the apparatus independent of the brushes.

26. A dolly as defined in claim 25 wherein said outlet conduit means are of unequal length, and further including an additional partition below said foraminous partition for directing fluid which has passed through said foraminous partition on opposite sides of said additional partition into respectively separate of said outlet conduit means.

27. A dolly as defined in claim 26 and further including a funnel element carried thereon for directing fluid into said chamber, said funnel element providing a venturi throat inlet to said chamber for fluid.

28. A dolly as defined in claim 23 wherein said wheel means comprises respectively separate wheel elements fixed to opposite ends of said frame means, and wherein said frame means includes depending arcuately contoured skirt walls adapted to partially surround the side periphery of the brushes, said skirt walls having openings therein for discharging fluid therethrough from said outlet conduit means.

29. A dolly as defined in claim 28 wherein said skirt walls are facingly convex and circular in contour.

30. Apparatus adapted to selectively receive floor polishing, scrubbing and cleaning attachments thereon, said apparatus comprising:

(a) base frame means having wall means with first and second openings therein, said wall means being adapted to receive attachments thereon in communicating relation with one of said first and second openings;

(b) a motor mounted on said base frame means;

(c) first fan means driven by said motor for creating a forced air stream;

(d) first passageway means for directing through said first opening said forced air stream;

(e) an auxiliary fan chamber in said base frame means, said auxiliary fan chamber having an inlet and an outlet;

(f) second passageway means communicating with said inlet of said auxiliary fan chamber with said second opening; and (g) second fan means disposed in said auxiliary fan chamber and driven by said motor for creating a re-reduced pressure at said second opening;

whereby attachments mounted on said wall means and communicating with said second opening are subjected to a partial vacuum and attachments mounted on said wall means and communicating with said first opening are subjected to a forced air stream.

31. Apparatus as defined in claim 30 and further including handle frame means, means pivotally mounting said handle frame means on said base frame means, a container removably supported on one of said frame means, and means for communicating said container with said second fan chamber.

32. Apparatus as defined in claim 30 and further including handle frame means, means pivotally mounting said handle frame means on said base frame means, a container removably supported on one of said frame means, and means communicating said container with said forced air stream.

33. Apparatus as defined in claim 30 and further including dolly means removably secured on said base frame means, said dolly means including a housing with frame means, said dolly means including a housing with at least one opening therein facing downwardly from said base frame means, said housing having a hollow portion communicating with said second opening.

34. Apparatus as defined in claim 30 and further including dolly means removably secured under said base frame means, said dolly means including conduit means therein for receiving said forced air stream from said first opening and directing the same generally horizontally outwardly of said dolly means.

35. Apparatus as defined in claim 30 and further including gear means disposed above said wall means, a pair of spaced apart rotatable shafts depending from said wall means and driven by said gear means, said gear means being driven by said motor, said second fan means comprising a housing on said wall means and a fan within said housing, and means drivingly connecting said second fan means and said gear means.

36. Apparatus as defined in claim 35 wherein said second fan is a centrifugal fan and wherein said housing has an inlet thereto communicating centrally with said fan and an outlet therefrom communicating tangentially with said second fan.

37. Apparatus as defined in claim 36 wherein said first fan means and said motor are mounted in a common housing with said first fan means constructed and arranged to draw air past said motor in creating said forced air stream.

38. Apparatus as defined in claim 30 wherein said wall means comprises a horizontally disposed plate-like member, a gear housing disposed on the top side of said member, said gear housing having a top wall and side walls supporting said top wall in spaced relation from the top side of said member, a pair of drive shafts journaled in said member in spaced apart relation to one another, said drive shafts having a lower portion depending from said member and an upper portion within said gear housing, a pair of gears mounted on the upper portion of each of said drive shafts and disposed within said gear housing, a pair of gear shafts depending from said top wall of said gear housing, a pair of gears mounted respectively on said gear shafts and within said housing, said drive gears meshing with one another and with respective of said first gears, a motor housing mounted above said top wall of said gear housing, said motor being disposed in said motor housing and having an output shaft leading from said motor housing and into said gear housing, said shaft being drivingly connected with one of said drive gears, a fan housing disposed on the underside of said plate-like member, a fan mounted in said fan housing, a shaft leading from said fan housing into said gear housing, said shaft being drivingly connected with at least one of said gears.

39. Apparatus as defined in claim 38 wherein said first fan means is mounted on said output shaft in said motor housing and is disposed to draw air across said motor for creating said forced air stream.

40. Apparatus as defined in claim 30 and further including handle frame means, means pivotally mounting said handle frame means on said base frame means, said handle frame means having a platform intermediate the ends thereof, conduit means leading from said platform and within said handle frame means to communicate said platform with said forced air stream, container means removably supported on said platform means and having an outlet communicating with said conduit means, second container means carried on said base frame means, said second container means being recessed, said base frame means including an upstanding portion having said motor disposed therein, said upstanding portion being received in the recess in said second container means, said platform being disposed on said handle frame means so as to be swingable over said second container means with pivotal movement of said handle frame means with respect to said base frame means, said second container means communicating with said second passageway means.

41. Apparatus as defined in claim 30 wherein said base frame means has an upstanding portion and further including container means carried on said base frame means about said upstanding portion, and third passageway means communicating the outlet of said auxiliary fan chamber with said container means.

42. Apparatus as defined in claim 41 and further including handle frame means, means pivotally mounting said handle frame means with respect to said base frame means, said handle frame means having a container supporting platform thereon, a second container supported on said handle frame means and conduit means communicating said second container with an opening in said wall means.

43. Apparatus as defined in claim 42 wherein said handle frame means includes a switch assembly mounted at the upper end thereof, conductor means connecting said switch assembly with said motor for control of said motor by said switch assembly, trigger means mounted on said upper end of said handle frame means whereby said trigger means and said switch assembly can be operated simultaneously with one hand of a user, said second container means having an outlet communicating with said conduit means, valve means for controlling the flow of fluid from said outlet through said conduit means, and means connecting said trigger means and said valve means for operation of said valve means by said trigger means.

44. Apparatus as defined in claim 43 wherein said container supporting platform is mounted on said handle frame means for movement above said first container, and further including a container retaining device mounted on said handle frame means above said platform for retaining a container between said retaining means and said platform.

45. Apparatus as defined in claim 30 and further including container means carried on said base frame means, and passageway means leading from said auxiliary fan chamber to said second container means whereby fluid passing in an air stream from said auxiliary fan chamber enters said container.

46. Apparatus as defined in claim 45 wherein said container has means including vent openings and partitions for separating liquids and gases in air streams passing thereto and retaining the liquids while permitting the gases to escape.

47. Apparatus as defined in claim 46 wherein said base frame means has a coupling thereon forming part of said passageway means, wherein said container means has an inlet cooperating with said coupling, and wherein said container is disposed in overlying surrounding relation to said motor.

48. Apparatus as defined in claim 46 and further including a handle assembly pivotally coupled to said base frame means, and moveable locking means for releaseably retaining said container on said base frame means, said locking means and said handle assembly including cooperating elements for moving said locking means to lock said container on said base frame means in response to pivotal movement of said handle assembly.

49. Apparatus as defined in claim 48 wherein said handle assembly includes a pair of arms at the lower end thereof pivotally moveable on opposite sides of said container.

50. Apparatus as defined in claim 49 and further including another container supported on said handle assembly for movement above the first mentioned container, and conduit means leading from said second container to said forced air stream.

References Cited by the Examiner

UNITED STATES PATENTS

| | | | |
|---|---|---|---|
| Re. 22,077 | 4/1942 | Kitto | 15—413 |
| 568,145 | 9/1896 | Sanderson | 137—171 |
| 2,136,268 | 11/1938 | Watts | 15—413 |
| 2,293,722 | 8/1942 | Erickson | 15—320 |
| 2,633,519 | 3/1953 | Vance | 200—168 |
| 2,765,382 | 10/1956 | Kelto | 200—168 |
| 2,778,448 | 1/1957 | Graves | 137—171 |
| 2,953,807 | 9/1960 | Nilsson | 15—413 XR |
| 2,986,764 | 6/1961 | Krammes | 15—320 |
| 3,036,321 | 5/1962 | Holt | 15—50 |
| 3,101,505 | 8/1963 | Belicka et al. | 15—320 |
| 3,153,251 | 10/1964 | Ohlson | 15—50 |

FOREIGN PATENTS

| | | |
|---|---|---|
| 1,286,204 | 1/1962 | France. |
| 1,081,200 | 5/1960 | Germany. |

ROBERT W. MICHELL, *Primary Examiner.*